US006954938B2

(12) United States Patent
Emberty et al.

(10) Patent No.: US 6,954,938 B2
(45) Date of Patent: Oct. 11, 2005

(54) APPARATUS AND METHOD TO TRANSPORT A DATA STORAGE MEDIUM DISPOSED IN A PORTABLE CARRIER

(75) Inventors: Robert George Emberty, Tucson, AZ (US); Craig Anthony Klein, Tucson, AZ (US); Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 300 days.

(21) Appl. No.: 10/054,834

(22) Filed: Jan. 23, 2002

(65) Prior Publication Data

US 2003/0137905 A1 Jul. 24, 2003

(51) Int. Cl.⁷ .......................... G11B 17/22; G11B 17/04
(52) U.S. Cl. ........................................ 720/632; 360/92
(58) Field of Search ........................... 720/632; 360/92; 414/277, 280, 281, 282; 29/65.5, 902; 361/644, 685; 369/30.43, 30.46

(56) References Cited

U.S. PATENT DOCUMENTS

| 3,780,423 | A | | 12/1973 | Lilienthal et al. ............. 29/568 |
| 4,079,690 | A | | 3/1978 | Paul ........................... 114/230 |
| 5,764,615 | A | * | 6/1998 | Ware et al. ............... 369/30.57 |
| 5,812,356 | A | | 9/1998 | O'Connor .................... 361/179 |
| 5,831,525 | A | * | 11/1998 | Harvey ........................ 340/507 |
| 6,464,509 | B1 | * | 10/2002 | Emberty et al. .............. 439/39 |
| 6,537,013 | B2 | * | 3/2003 | Emberty et al. ............ 414/280 |
| 2003/0007285 | A1 | * | 1/2003 | Emberty et al. ......... 360/98.06 |

* cited by examiner

Primary Examiner—William J Klimowicz
(74) Attorney, Agent, or Firm—Dale F. Regelman

(57) ABSTRACT

A portable carrier for a data storage medium is disclosed. An accessor which includes an electromagnet and a fixturing assembly is disclosed. A data storage and retrieval system which includes at least one of Applicants' carriers and at least one of Applicants' accessors is disclosed. A method to releaseably attach Applicants' carrier to Applicants' accessor is disclosed. A method to retrieve, transport, and place Applicants' carrier within a data storage and retrieval system is disclosed.

10 Claims, 19 Drawing Sheets

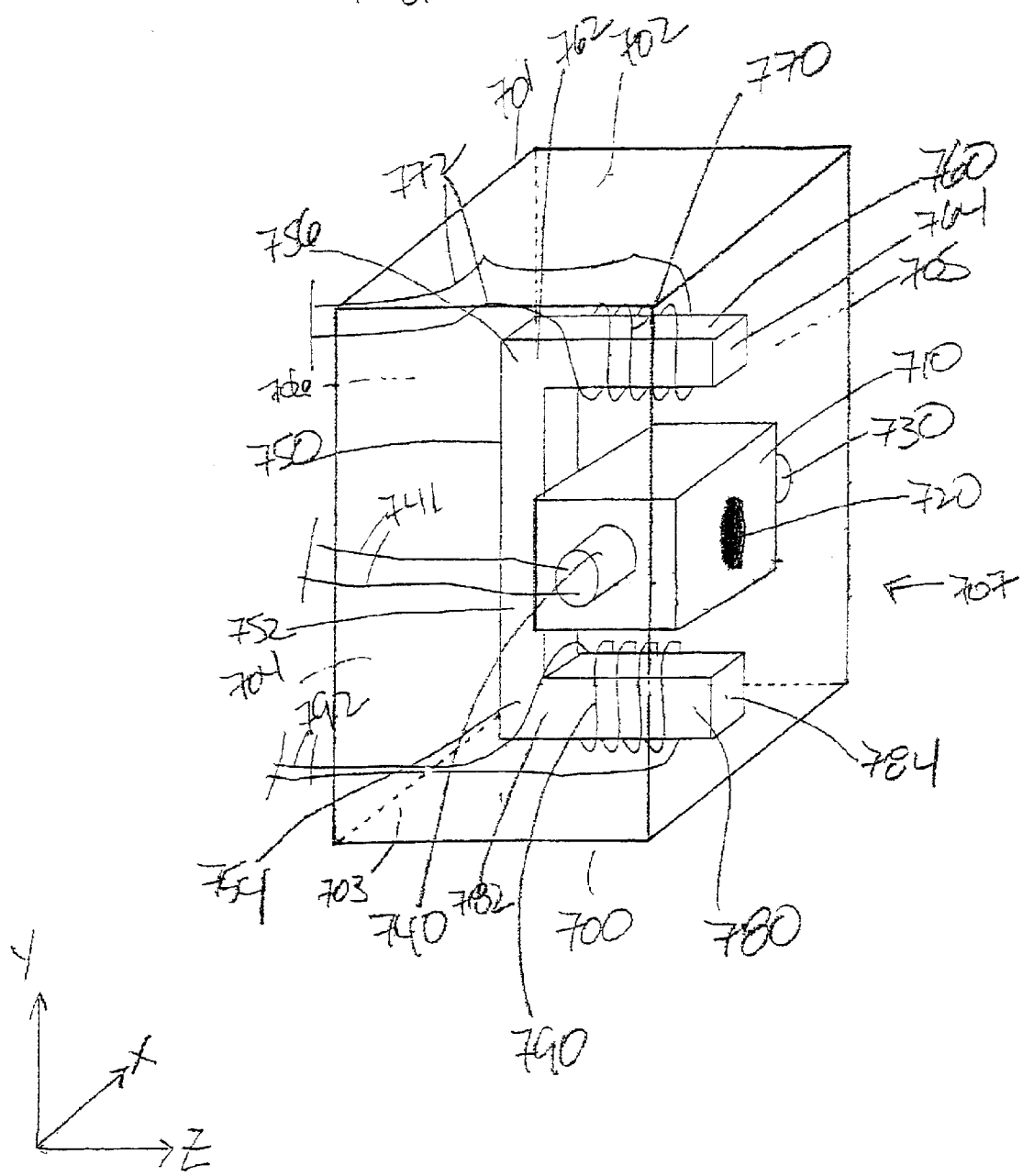

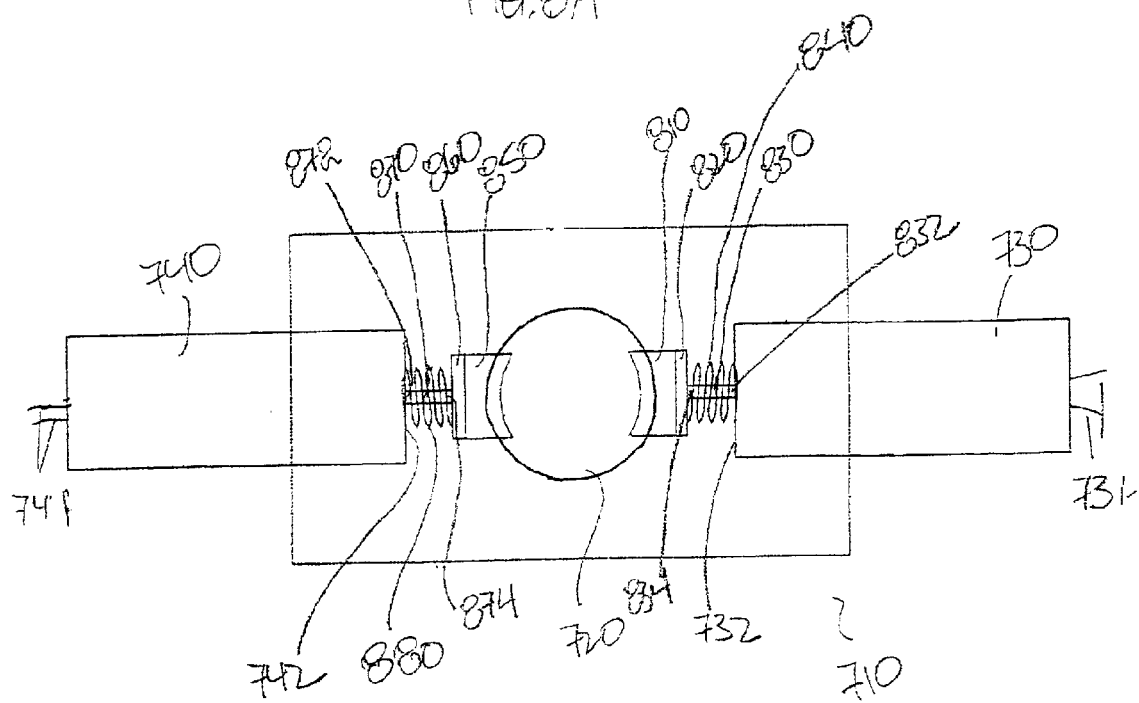
FIG. 8A
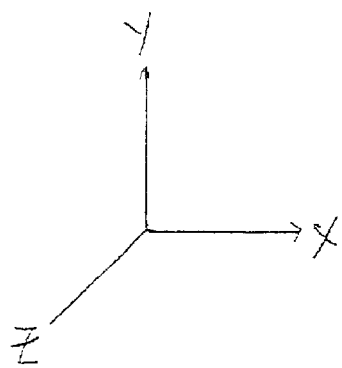

FIG. 8B
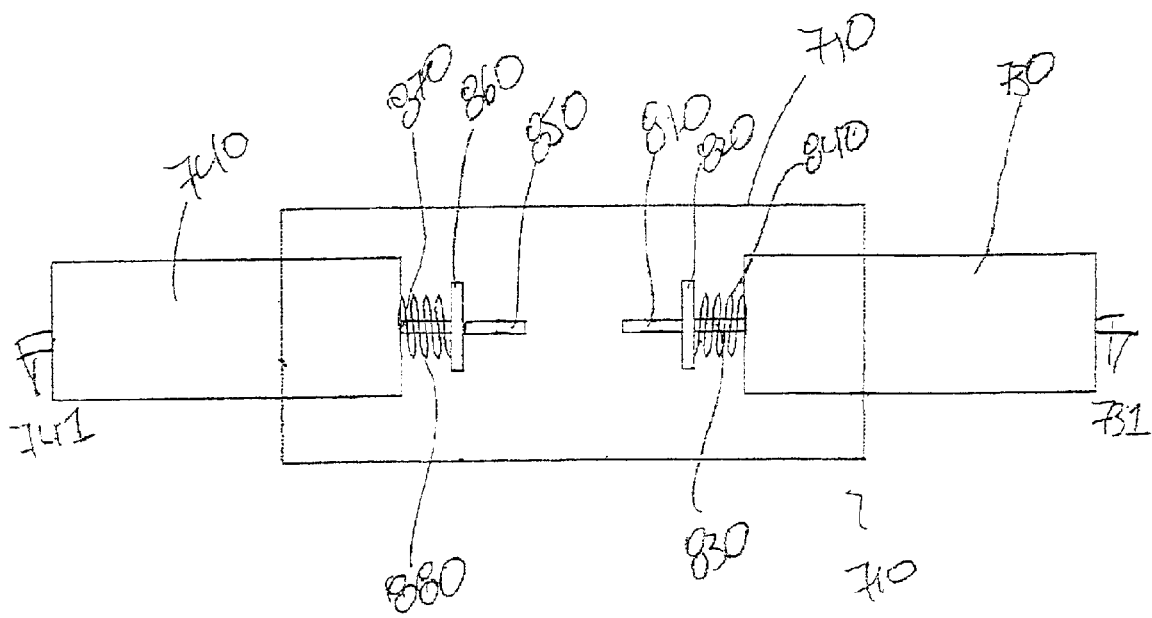
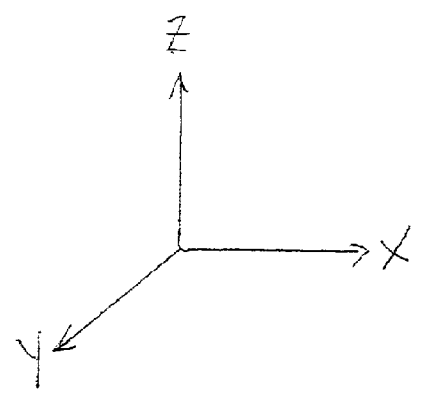

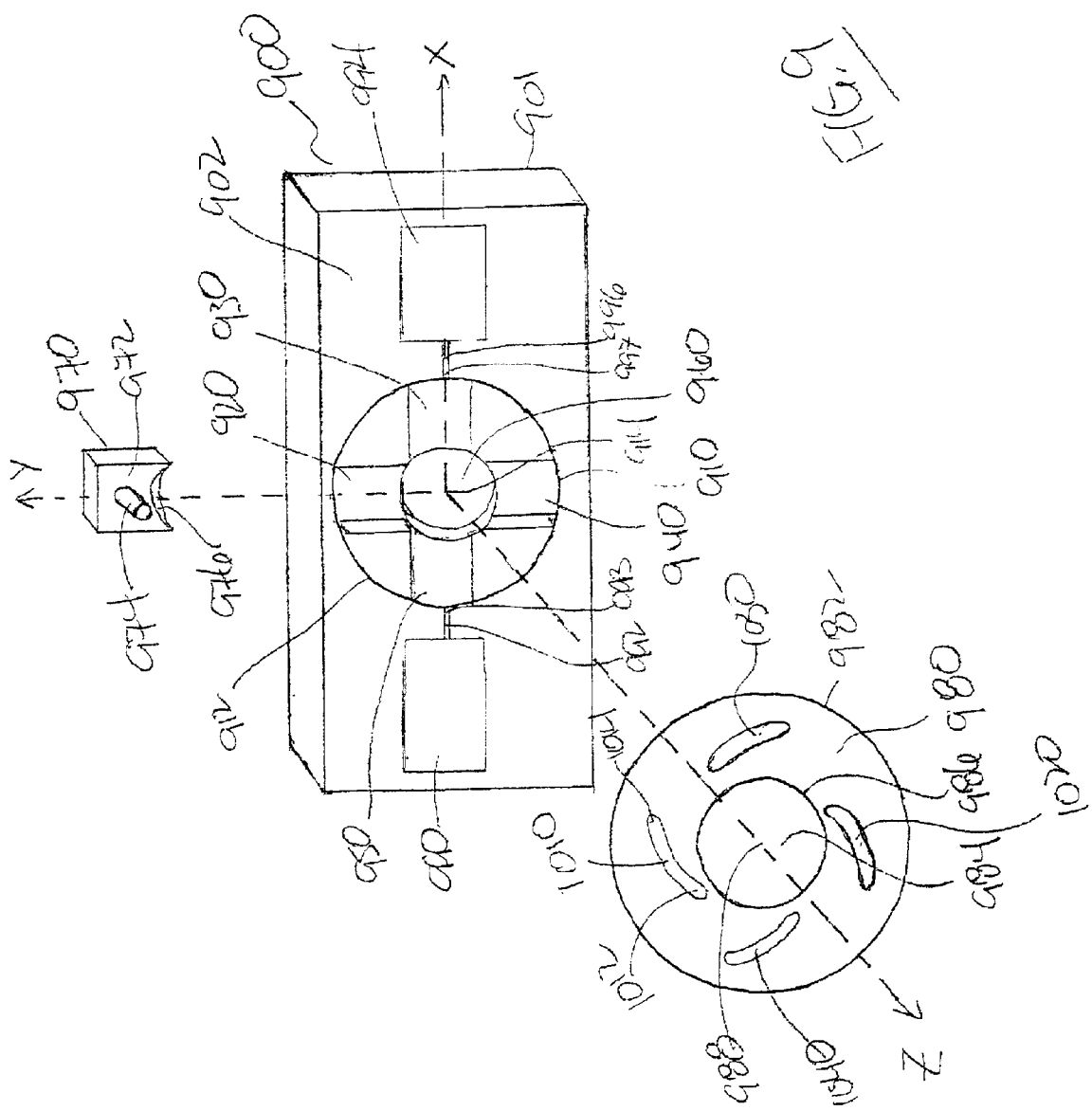

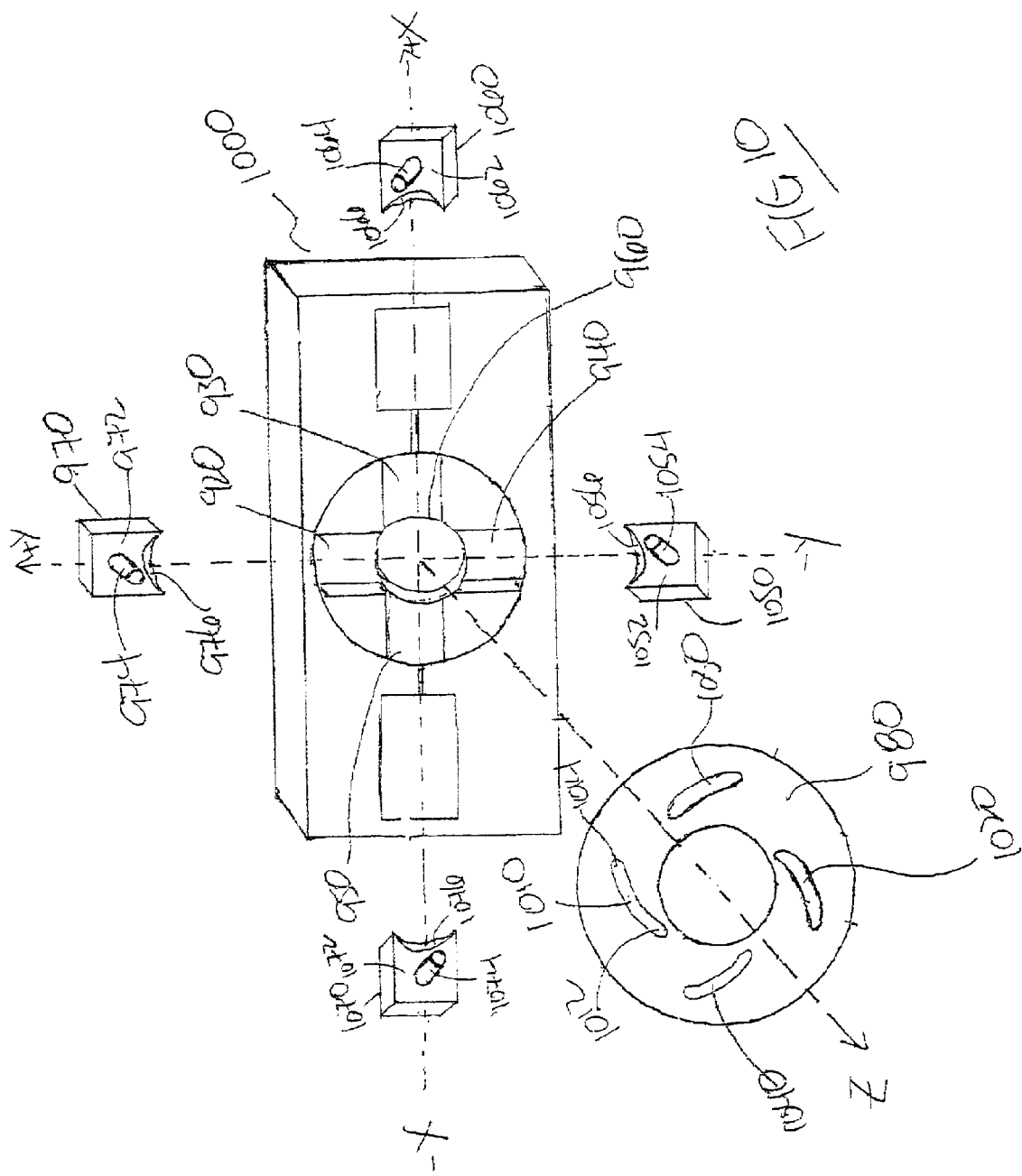

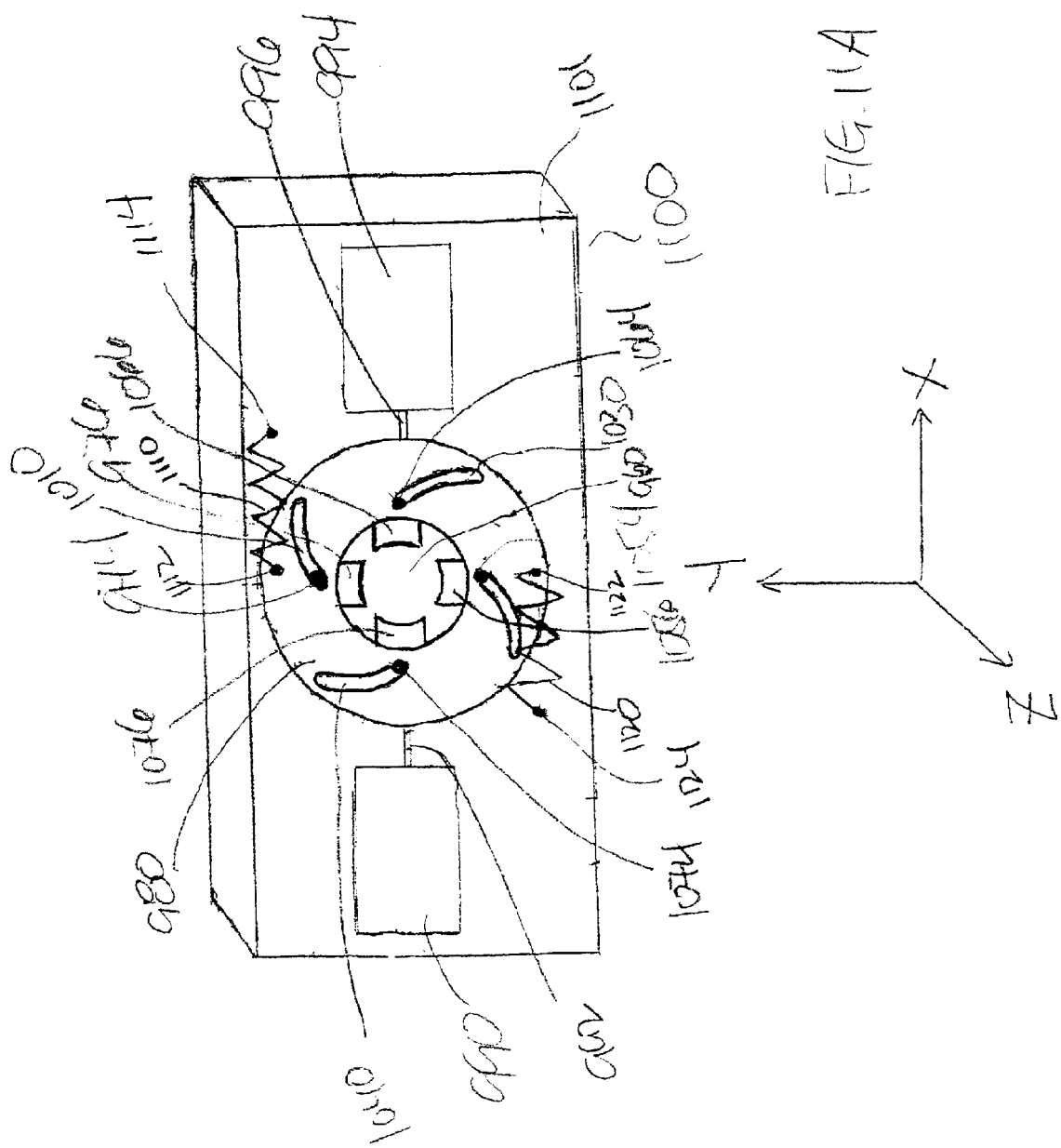

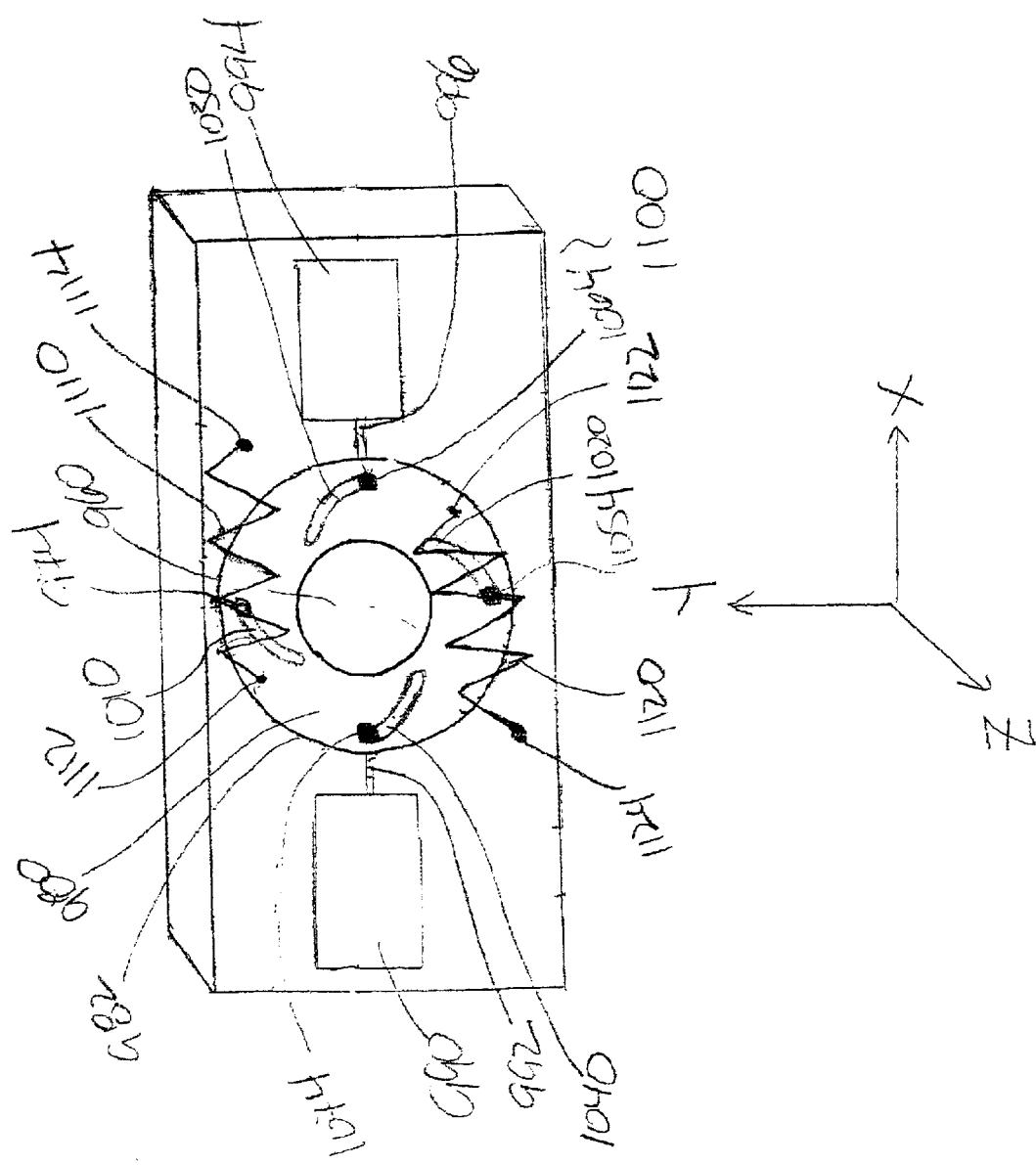

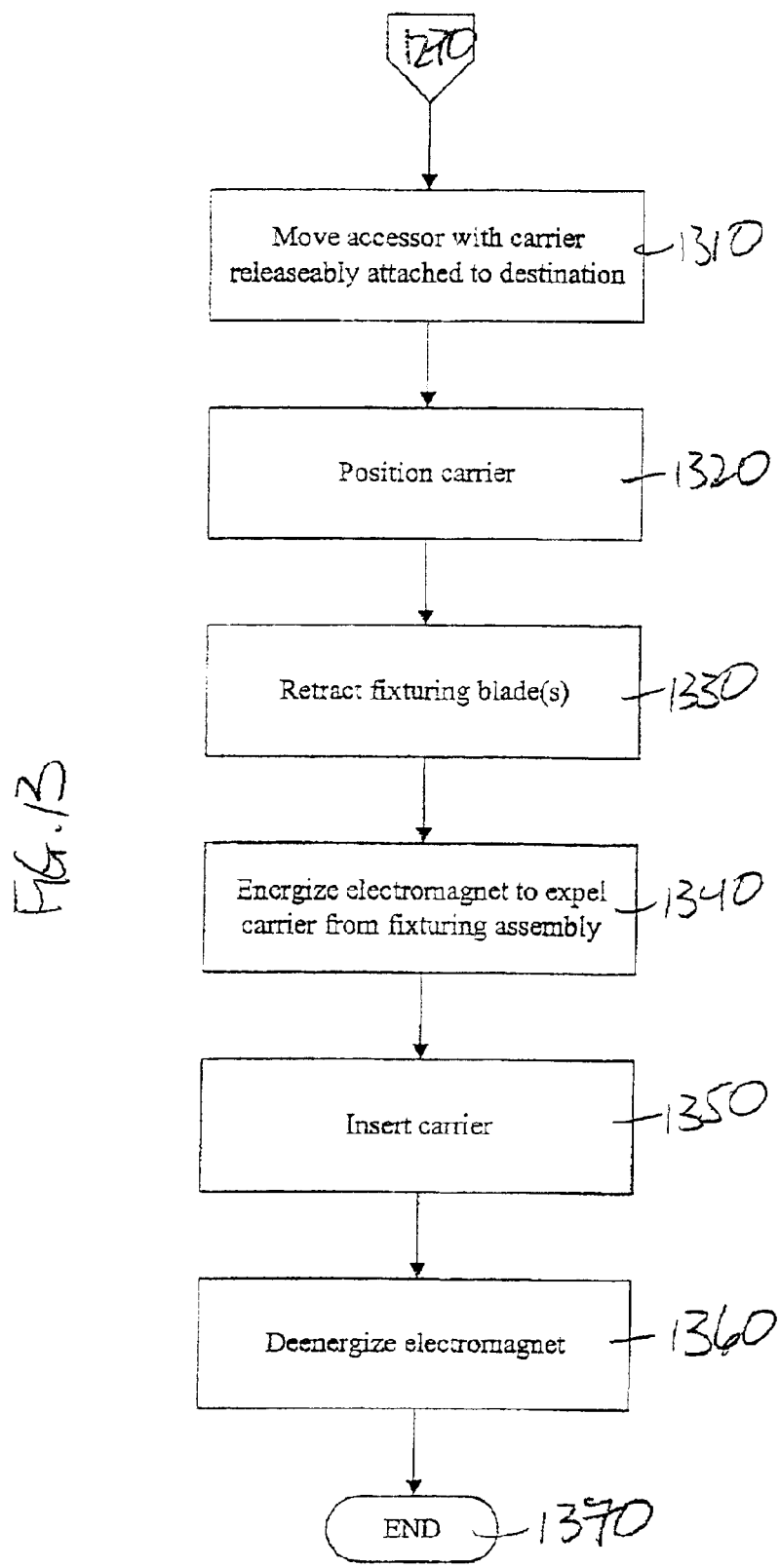

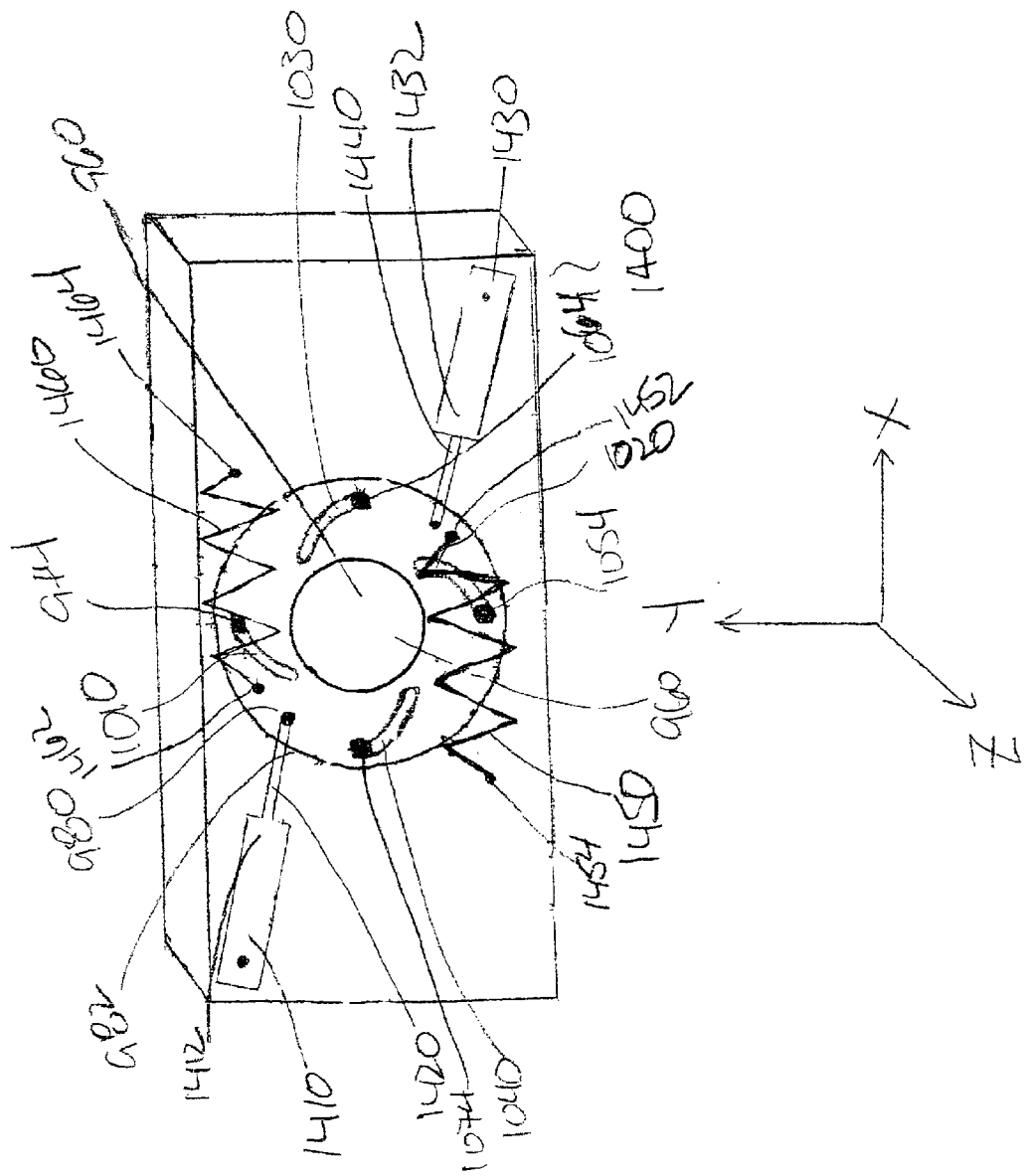

APPARATUS AND METHOD TO TRANSPORT A DATA STORAGE MEDIUM DISPOSED IN A PORTABLE CARRIER

FIELD OF THE INVENTION

Applicant's invention relates to a portable carrier for a data storage medium, where one or more of Applicants' carriers are moveably disposed in Applicants' data storage and retrieval system. Applicants' invention further relates to an accessor which includes a gripper mechanism that can releaseably attach Applicants' carrier. Applicants' invention further relates to a method to transport a data storage medium using Applicants' carrier and Applicants' accessor.

BACKGROUND OF THE INVENTION

Automated media storage libraries are known for providing cost effective access to large quantities of stored information. Generally, media storage libraries include a large number of storage slots on which are stored portable data storage media. One (or more) accessors retrieve one or more designated data storage media from the storage slots and deliver the accessed media to one or more appropriate data storage devices for reading and/or writing information on the accessed media. Suitable electronics operate the accessor(s) and operate the data storage device(s) to provide information to, and/or to receive information from, one or more attached host computers.

In certain embodiments, the storage slots are arranged in a planar orthogonal arrangement forming a "wall" of storage slots for holding data storage media. The plane may be a flat plane, or may be a cylindrical plane. In certain embodiments, two "walls" of storage slots may be provided on either side of the one or more accessors.

A number of different companies manufacture automated media storage libraries today, each model displaying various different features. One example is the IBM 3584 Media Storage Library. Some of the automated media storage libraries have dual or multiple accessors to provide a level of redundancy and to enhance performance.

SUMMARY OF THE INVENTION

Applicants' invention includes a portable carrier for a data storage medium, where that carrier comprises an enclosure having a front bezel portion, at least one permanent magnet disposed in that bezel portion, a guidepin disposed on that bezel portion, where that guidepin includes at least one groove. Applicants' invention further includes an accessor moveably disposed in a data storage and retrieval system, where that accessor includes an electromagnet and a fixturing assembly disposed adjacent that electromagnet, where that fixturing assembly includes at least one solenoid/motor having a moveable fixturing blade connected thereto. Applicants' invention further includes a data storage and retrieval system which includes at least one of Applicants' carrier and at least one of Applicants' accessors.

Applicants' invention further includes a method to releaseably attach Applicants' carrier to Applicants' accessor. Applicants' method includes the steps of positioning Applicants' accessor adjacent the bezel portion Applicants' carrier, retracting the fixturing blade, energizing the electromagnet, inserting the guidepin in the fixturing assembly, extending the fixturing blade, and deenergizing the electromagnet.

Applicants' invention further includes a method using Applicants' accessor to retrieve Applicants' carrier, transport that carrier to a designated destination, and removeably dispose that carrier, for example, in a data transfer station or in a storage slot. In one embodiments, Applicants' method to retrieve, transport, and insert Applicants' carrier includes the steps of positioning Applicants' accessor adjacent the bezel portion of Applicant's carrier, retracting the fixturing blade, energizing the electromagnet such that the electromagnet has a first polarity, pulling the guidepin into the fixturing assembly, extending the fixturing blade, deenergizing the electromagnet, moving the accessor to a data transfer station, positioning the accessor adjacent the backplane portion of that data transfer station, retracting the fixturing blade, energizing the electromagnet such that the electromagnet has a second polarity, releaseably attaching the carrier to the backplane, and deenergizing the electromagnet.

Applicants' invention further includes a data storage and retrieval system which includes a computer useable medium having computer readable program code disposed therein for implementing Applicants' method to releaseably attach Applicants' carrier to Applicants' accessor. Applicants' invention further includes a data storage and retrieval system which includes a computer useable medium having computer readable program code disposed therein for implementing Applicants' method using Applicants' accessor to retrieve, transport, and insert Applicants' carrier in a designated destination.

BRIEF DESCRIPTION OF THE DRAWINGS

The invention will be better understood from a reading of the following detailed description taken in conjunction with the drawings in which like reference designators are used to designate like elements, and in which:

FIG. 7 is a perspective view of Applicants' gripper mechanism which includes a first embodiment of Applicants' fixturing assembly;

FIG. 8A is a side view of that first embodiment of Applicants' fixturing assembly;

FIG. 8B is a top view of that first embodiment of Applicants' fixturing assembly;

FIG. 9 is a perspective view of a second embodiment of Applicants' fixturing assembly;

FIG. 10 is a perspective view of a third embodiment of Applicants' fixturing assembly;

FIG. 11A is a perspective view of a first orientation of a fourth embodiment of Applicants' fixturing assembly;

FIG. 11B is a perspective view of a second orientation of that fourth embodiment of Applicants' fixturing assembly;

FIG. 13 is a flow chart summarizing the steps in Applicants' method to place Applicants' carrier;

FIG. 14B is a perspective view of a second orientation of that fifth embodiment of Applicants' fixturing assembly.

DETAILED DESCRIPTION OF THE PREFERRED EMBODIMENTS

Referring to the illustrations, like numerals correspond to like parts depicted in the figures. The invention will be described as embodied in an automated data storage and retrieval subsystem for use in a data processing environment. The following description of Applicant's apparatus and method is not meant, however, to limit Applicant's invention to either data storage and retrieval systems, or to data processing applications, as the invention herein can be applied generally to information storage and retrieval apparatus and methods.

Figure 3:
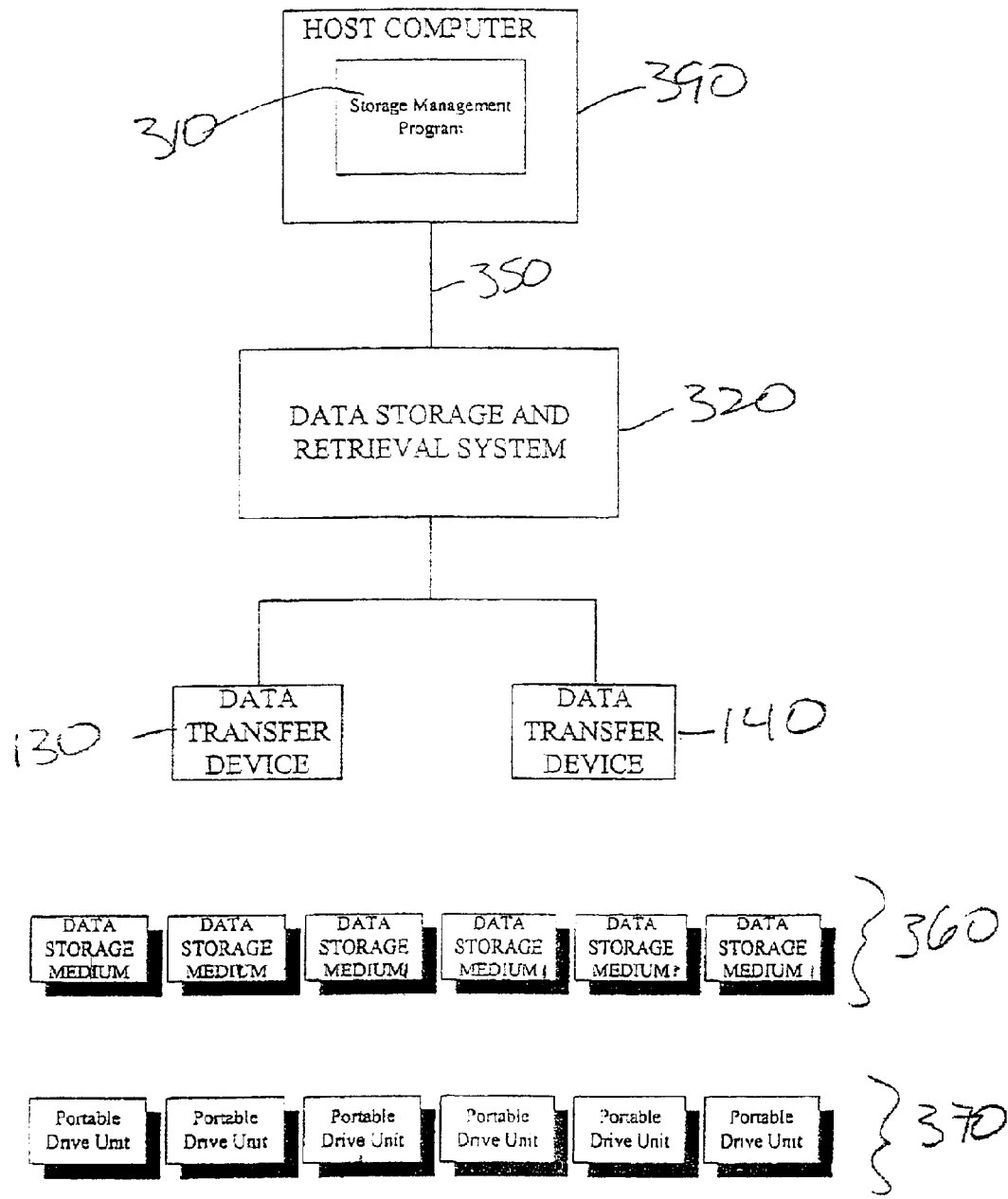
FIG. 3 is a block diagram of Applicants' data storage and retrieval system.

FIG. 3 illustrates the hardware and software environment in which preferred embodiments of the present invention are implemented. Host computer 390 includes, among other programs, a storage management program 310. In certain embodiments, host computer 390 comprises a single computer. In alternative embodiments, host computer 390 comprises one or more mainframe computers, one or more work stations, one or more personal computers, combinations thereof, and the like.

Information is transferred between the host system 390 and secondary storage devices managed by a data storage and retrieval system, such as data storage and retrieval system 320, via communication link 350. Communication link 350 comprises a serial interconnection, such as an RS-232 cable or an RS-432 cable, an ethernet interconnection, a SCSI interconnection, a Fibre Channel interconnection, an ESCON interconnection, a FICON interconnection, an ethernet interconnection, a gigabit ethernet interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

In the embodiment shown in FIG. 3, data storage and retrieval system 320 includes data transfer devices 130 (FIGS. 1, 2, 3, 4) and 140 (FIGS. 1, 2, 3, 4). In alternative embodiments, Applicants' data storage and retrieval system 320 includes more than two data transfer devices. In alternative embodiments, Applicants' data storage and retrieval system 320 includes a single data transfer device.

A plurality of data storage media 360 are each moveably disposed within data storage and retrieval system 320. Each of these portable data storage media are individually disposed in a plurality of portable data drive units 370. Each of these portable data drive units may be releaseably connected to an appropriate data transfer device, such as device 130 (FIGS. 1, 2, 3, 4), and thereafter accessed by host computer 390. Data storage and retrieval system 320 further includes program logic to manage data transfer devices 130 and 140 (FIGS. 1, 2, 3, 4), plurality of portable data storage media 360, and plurality of data drive units 370. In certain embodiments, data storage and retrieval system 320 and host system 390 may be collocated on a single apparatus.

Host system 390 comprises a computer system, such as a mainframe, personal computer, workstation, etc., including an operating system such as Windows, AIX, Unix, MVS, LINUX, etc. (Windows is a registered trademark of Microsoft Corporation; AIX is a registered trademark and MVS is a trademark of IBM Corporation; and UNIX is a registered trademark in the United States and other countries licensed exclusively through The Open Group.) The storage management program 310 in the host system 390 may include the functionality of storage management type programs known in the art that manage the transfer of data to a tape library, such as the IBM DFSMS implemented in the IBM MVS operating system.

The IBM DFSMS software is described in "DFSMS/MVS V1R4 General Information," IBM document no. GC26-4900-05, published by IBM (Copyright 1997, IBM), which publication is incorporated herein by reference in its entirety. In addition to including known storage management program functions, such as recall and migration, the storage management program 310 would further include additional program instructions to perform the operations of the preferred embodiments of the present invention. The storage management program 310 may be implemented within the operating system of the host system 390 or as a separate, installed application program. Alternatively, storage management program 310 may include device drivers, backup software, and the like.

Figure 1:
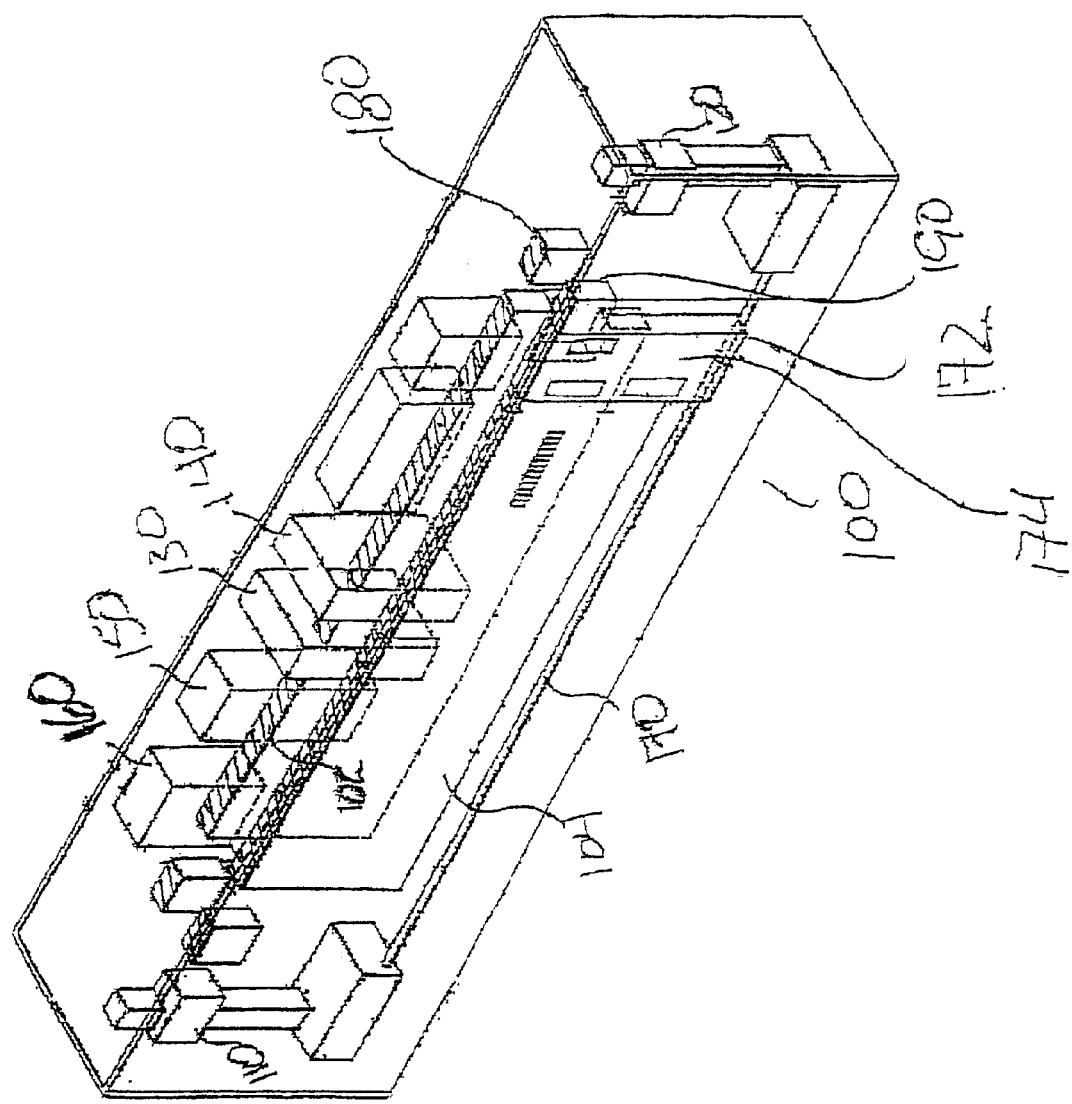
FIG. 1 is a perspective view of first embodiment of Applicant's data storage and retrieval system.

The data storage and retrieval system 320 comprises a computer system, and manages a plurality of data storage media, each of which is disposed in one of Applicants' portable carriers. Referring now to FIG. 1, automated data storage and retrieval system 100 is shown having a first wall of storage slots 102 and a second wall of storage slots 104. Portable data storage media are individually housed in one of Applicants' carriers, and those individual carriers are stored in the various storage slots.

Applicant's automated data storage and retrieval system includes one or more accessors, such as accessors 110 and 120. An accessor is a robotic device which accesses Applicants' carrier from first storage wall 102 or second storage wall 104, transports that accessed carrier, and the data storage medium disposed therein, to data transfer devices 130/140 for reading and/or writing data on that medium, and returns the carrier to the proper storage slot. As shown in FIG. 1, accessors 110 and 120 travel bi-directionally along rail 170 in an aisle disposed between first wall of storage slots 102 and second wall of storage slots 104. As shown in FIG. 1, accessors 110 and 120 are both moveably disposed on rail system 170. U.S. Pat. No. 6,038,490, entitled "Automated Data Storage Dual Picker Interference Avoidance," teaches a method to prevent collisions occurring between accessors moveably disposed on the same rail system, and is hereby incorporated by reference herein.

Figure 4:
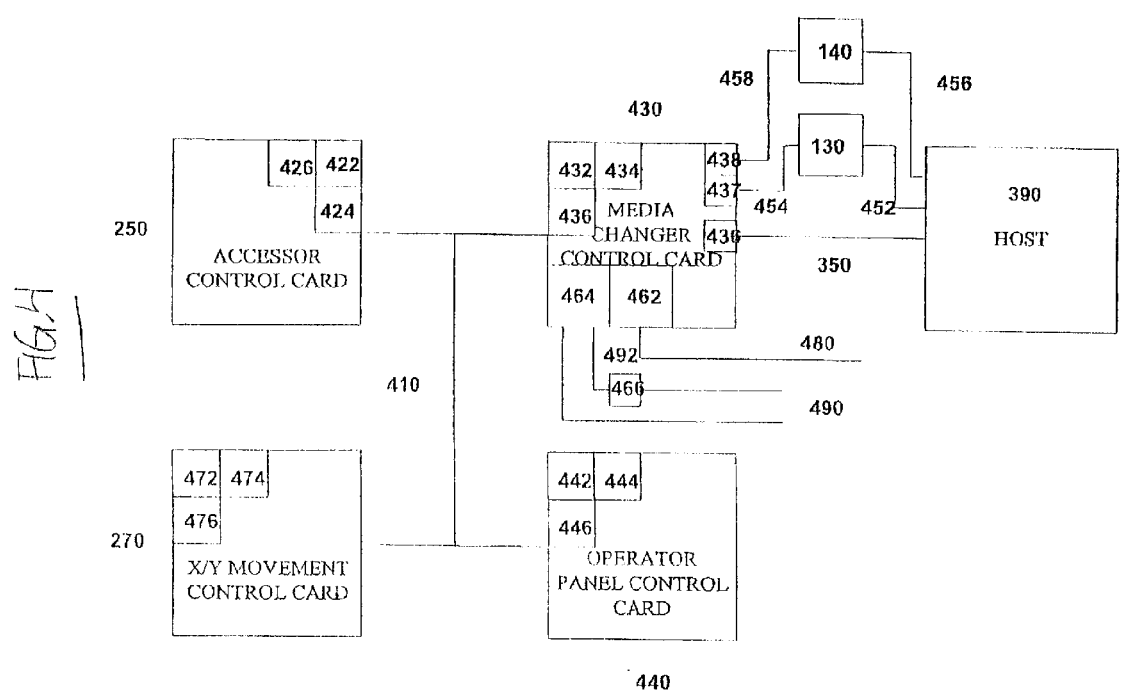
FIG. 4 is a is a schematic showing Applicant's distributed control network.

In certain embodiments, device 160 comprises a library controller. In certain of these embodiments, library controller 160 is integral with a host computer, such as host computer 390 (FIG. 3). In other embodiments, Applicants' data storage and retrieval system utilizes a distributed control network. In these distributed control network embodiments, device 160 comprises a motion card pack. Motion card pack 160 includes media changer control card 430 (FIG. 4). Media changer control card 430 communicates with host computer 390 (FIGS. 3, 4).

Referring again to FIG. 1, operator input station 150 permits a user to communicate with Applicant's automated data storage and retrieval system 100. Power component 180 and power component 190 each comprise one or more power supply units which supply power to the individual components disposed within Applicant's automated data storage and retrieval system. Import/export station 172 includes access door 174 pivotably attached to the side of system 100. Portable data storage cartridges can be placed in the system, or in the alternative, removed from the system, via station 172/access door 174.

Figure 2:
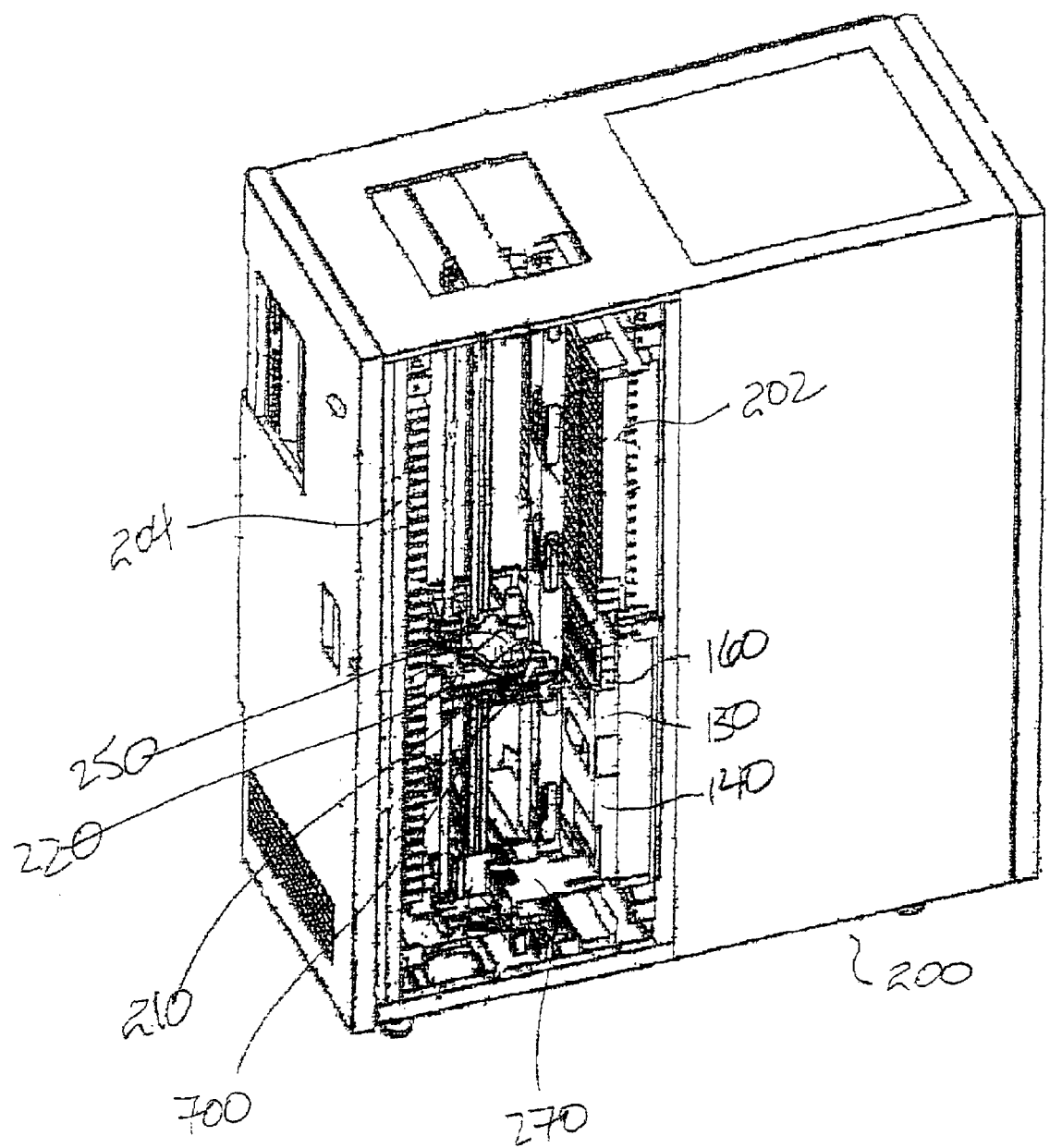
FIG. 2 is a perspective view of a portion of a second embodiment of Applicant's data storage and retrieval system.

FIG. 2 shows system 200 which comprises another embodiment of Applicant's data storage and retrieval system. System 200 includes first storage wall 202 and second storage wall 204. Storage walls 202 and 204 each include a plurality of storage elements in which can be stored a plurality of Applicants' carriers, each of which houses a data storage medium disposed therein. System 200 includes one or more data transfer devices, such as devices 130 and 140. System 200 further includes controller/motion card pack 160. In certain embodiments, system 200 further includes an operator control panel (not shown in FIG. 3).

System 200 further includes one or a plurality of carriers 500 (FIGS. 5, 6A, 6B, 6C) each housing one or more data storage media therein, such as one or more of plurality 360 (FIG. 3) of data storage media. In certain embodiments, each carrier further includes one or more of plurality 370 (FIG. 3) of data drive units to read/write information on the one or more data storage media disposed therein.

System 200 also includes at least one robotic accessor 210 for transporting a designated portable carrier/data storage medium between a storage slot disposed in first wall 202 or second wall 204 and data transfer device 130/140. Accessor 210 includes lifting servo section 220 on which is disposed at least one gripper mechanism 700 (FIG. 7) and, in certain embodiments, accessor control card 250. In certain embodiments, accessor 210 further includes X/Y movement control card 270.

FIG. 4 shows Applicant's distributed control network used in certain embodiments of data storage and retrieval systems 100 and 200. This distributed control system includes accessor control card 250 (FIGS. 2, 4), X/Y movement control card 270 (FIGS. 2, 4), operator panel control card 440 and media changer control card 430.

Communication bus 410 interconnects accessor control card 250, X/Y movement control card 270, operator panel control card 440 and media changer control card 430. In certain embodiments, bus 410 comprises an ethernet interconnection or a CANbus interconnection. Those skilled in the art will appreciate that CANbus technology was developed in the automotive industry, but now has gained wide acceptance in other industries.

In certain embodiments, accessor control card 250 is disposed on the lifting servo portion of accessor 110/120/210 (FIGS. 1, 2). In the embodiment shown in FIG. 4, accessor control card 250 includes microprocessor 422, non-volatile memory 424, and volatile memory 426. In certain distributed control network embodiments, accessor control card 250 (FIGS. 2, 4) serves as the library controller in Applicant's distributed control network.

Operator panel control card 440 is disposed within operator control panel 150 (FIG. 1). In the embodiment shown in FIG. 4, operator panel control card 440 includes microprocessor 442, nonvolatile memory 444, and volatile memory 446.

In certain embodiments, X/Y movement control card 270 is disposed on carriage portion of accessors 110 (FIG. 1), 120 (FIG. 1), 210 (FIG. 2). In the embodiment shown in FIG. 4, X/Y movement control card 270 includes microprocessor 472, nonvolatile memory 474, and volatile memory 476.

Media changer control card 430 is disposed within motion card pack 160 (FIGS. 1, 2). Media changer control card 430 includes microprocessor 432, nonvolatile memory 434, and volatile memory 436. In certain embodiments, media changer control card 430 includes network interface 462 which interconnects media changer control card 430 to one or more networks, such as network 480. In certain embodiments, network 480 comprises one or more local area networks, one or more private wide area networks, one or more public wide area networks, the internet, and combinations thereof.

In certain embodiments, media changer control card 430 includes device 464 which interconnects media changer control card 430 to one or more telephone systems, such as telephone system 490. In certain embodiments, device 464 comprises a modem. In these embodiments, modem 464 interconnects directly with telephone system 490. In alternative embodiments device 464 comprises a modem interface. In these embodiments, modem interface 464 interconnects via communication link 492 to modem 466. Modem 466 connects to telephone system 490. In certain embodiments, telephone system 490 comprises one or more private telephone systems, one or more public telephone systems, and combinations thereof.

Host computer 390 (FIGS. 3, 4) communicates with data transfer device 130 (FIGS. 1, 2, 3, 4) and data transfer device 140 (FIGS. 1, 2, 3, 4) via communication links 452 and 456, respectively. Data transfer devices 130/140 communicate with media changer control card 430 via communication links 454/458 and interfaces 437/438, respectively. In certain embodiments, host computer 390 also communicates with media changer control card 430 via communication link 350 and interface 436. As those skilled in the art will appreciate, communication link 350 and interface 436 provide a control path into Applicant's distributed control network. Communication links 350, 452, 454, 456, and 458, are selected from the group comprising a serial interface, a local area network, a private wide area network, a public wide area network, a SCSI interface, a Fibre Channel interface, an ESCON interface, a FICON interface, an ethernet interconnection, a gigabit ethernet interconnection, and combinations thereof.

Figure 5:
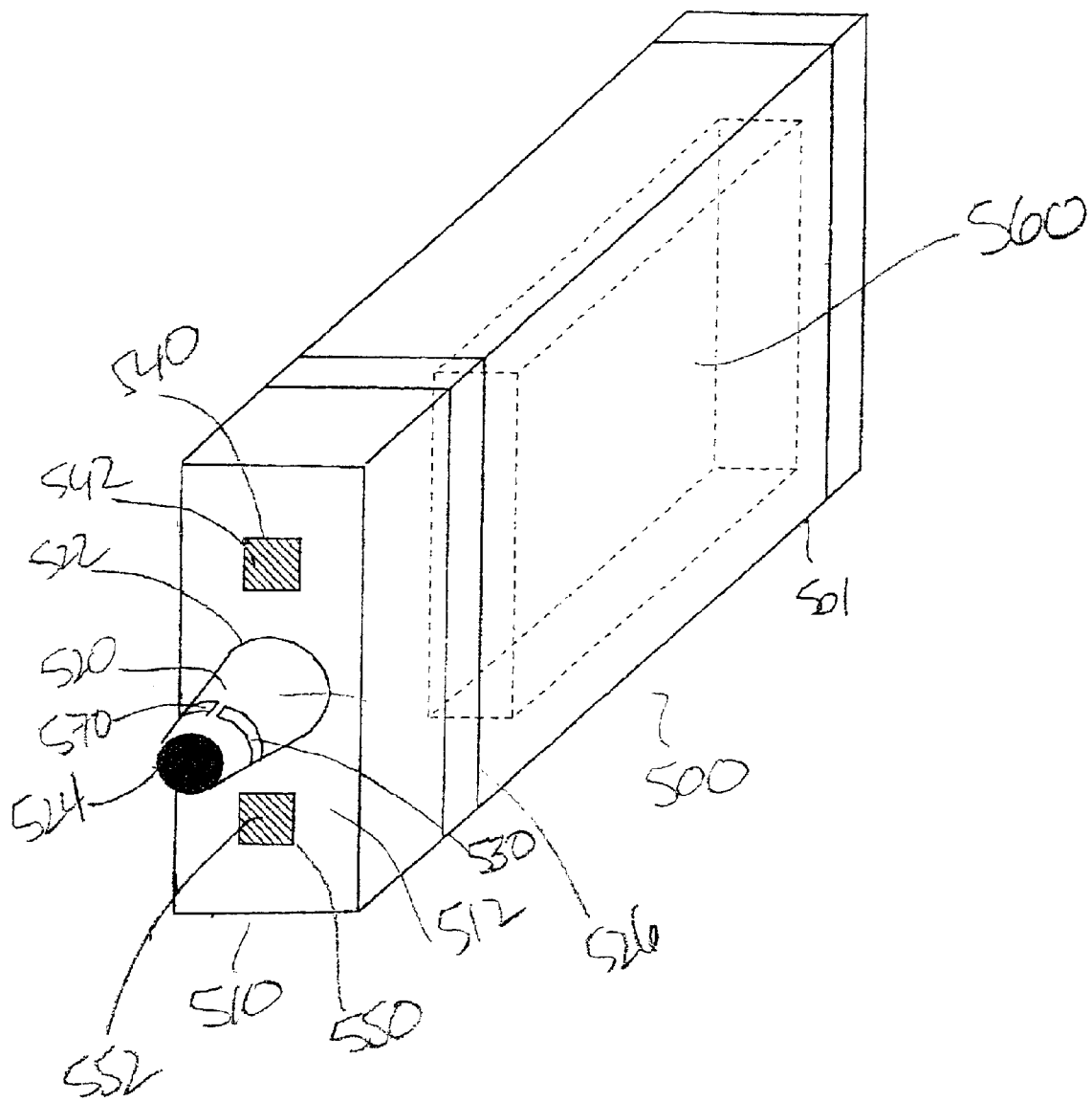
FIG. 5 is a perspective view of Applicants' carrier.

Referring to FIG. 5, data storage medium carrier 500 comprises enclosure 501 having bezel 510 disposed on a first end. Carrier 500 further includes guidepin 520 having first end 522 and second end 524. First end 522 of guidepin 520 is disposed on bezel 510. Second end 524 extends outwardly from bezel 510. In certain embodiments, guidepin 520 is formed integral to bezel 510. In other embodiments, guidepin 520 is formed separately from bezel 510 and is affixed to bezel 510 using well-known attachment techniques, such as adhesive bonding, plastics welding, metal welding, and/or use of mechanical devices such as screws, nuts, bolts, and the like.

In the embodiment shown in FIG. 5, guidepin 520 has a conical shape. In other embodiments, the shape of guidepin 520 is selected from the group including a cylindrical shape, an ovoid shape, a square shape, a rectangular shape, a pentagonal shape, a hexagonal shape, a heptagonal shape, and the like.

Carrier 500 further includes at least one magnet, such as first magnet 540. First magnet 540 comprises a "permanent" magnet, i.e. magnet 540 is formed from a ferrimagnetic material and/or a ferromagnetic material. Magnet 540 has a net magnetization with or without the presence of an applied magnetic field. In addition, magnet 540 has a fixed magnetic polarity, where that polarity does not change in the presence of an applied magnetic field. In the embodiment shown in FIG. 5, surface 542 of magnet 540 extends through surface 512 of bezel 510. In other embodiments, magnet 540 is internally disposed within bezel 510 adjacent surface 512.

In the embodiment shown in FIG. 5, carrier 500 includes second magnet 550. Second magnet 550 comprises a "permanent" magnet, i.e. magnet 550 is formed from a ferrimagnetic material and/or a ferromagnetic material. Magnet 550 has a net magnetization with or without the presence of an applied magnetic field. In addition, magnet 550 has a fixed magnetic polarity, where that polarity does not change in the presence of an applied magnetic field. In the embodiment shown in FIG. 5, surface 552 of magnet 550 extends through surface 512 of bezel 510. In other embodiments, magnet 550 is internally disposed within bezel 510 adjacent surface 512.

Guidepin 520 includes at least one groove in surface 526. The embodiment shown in FIG. 5 includes first groove 530 and second groove 570. In the embodiment shown in FIG. 5, grooves 530 and 570 are disposed in surface 526 so as to be substantially equidistant from bezel surface 512.

FIG. 5 shows assembly 560 disposed internally within carrier 500. Assembly 560 includes data storage medium 562 (FIG. 6B). In certain embodiments, data storage medium 562 comprises a magnetic data storage medium. In certain embodiments, data storage medium 562 comprises an optical data storage medium. In certain embodiments, data storage medium 562 comprises electronic data storage medium.

In certain embodiments, assembly 560 further includes a data drive unit. In these embodiments, data storage medium 562 (FIG. 6B) is disposed in that data drive unit. In these embodiments, the data drive unit includes a read/write head such that the data drive unit can read and/or write information to data storage medium 562 disposed therein.

Figure 6A:
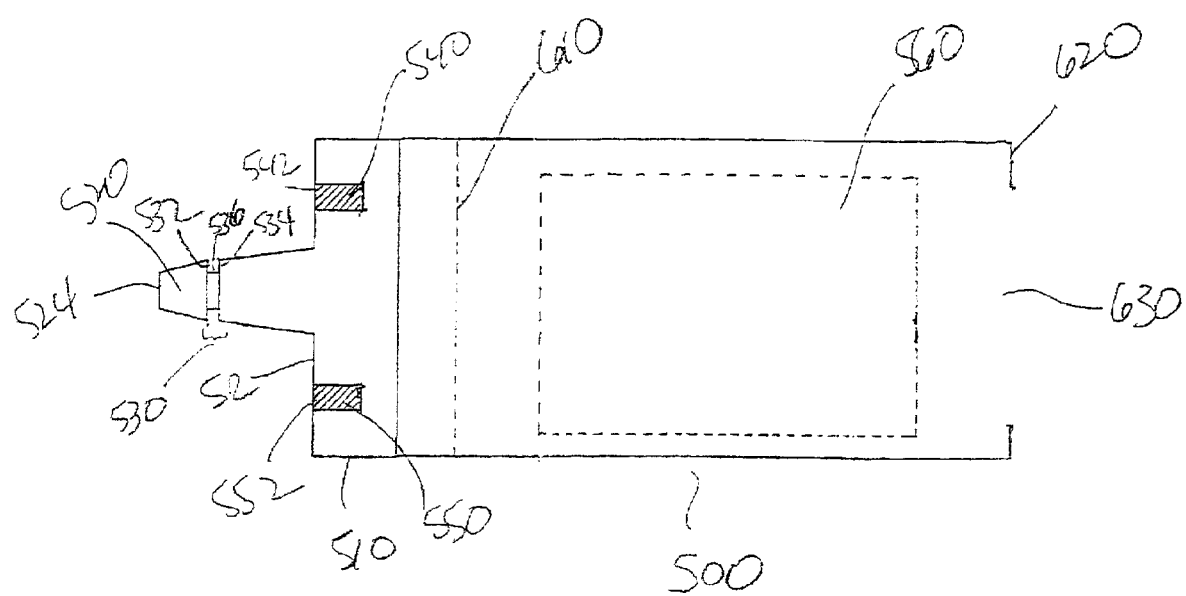
FIG. 6A is a top view of one embodiment of Applicants' carrier.
Figure 6B:
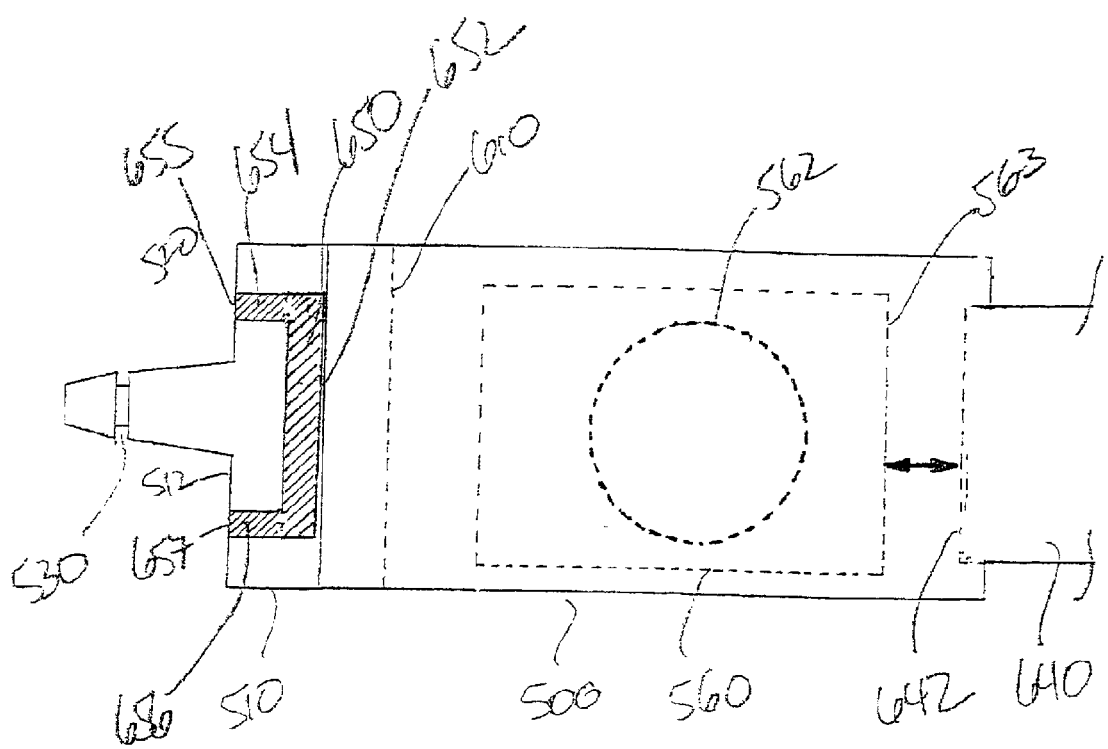
FIG. 6B is a top view of a second embodiment of Applicants' carrier.

FIG. 6A is a top view of carrier 500. In the embodiment shown in FIG. 6A, second end 620 is disposed on the opposite end from bezel portion 510. End 620 includes an aperture 630 through which a backplane assembly 640 (FIG. 6B) can extend to releaseably attach electrical and communication interconnections to assembly 560. Such a backplane assembly is disposed in, for example, data transfer device 130 (FIGS. 1, 2, 3, 4)/140 (FIGS. 1, 2, 3, 4).

As FIG. 6A shows, carrier 500 includes magnetic field shield 610. Magnetic field shield 610 protects the data storage medium disposed in assembly 560 from magnetic fields generated external to assembly 560. In certain embodiments, shield 610 comprises a copper foil.

Groove 530 disposed in guidepin 520 includes first wall 532 and second wall 534 connected by floor 536. The heights of walls 532 and 534 can vary widely between about 0.01 mm and about 3 mm. By height of wall 532, Applicants mean the distance between floor 536 and surface 526 of guidepin 520. In certain embodiments, the height of wall 532 is substantially equal to the height of wall 534. By substantially equal, Applicant's mean those heights differ by about plus or minus 10 percent or less. In other embodiments, the heights of walls 532 and 534 differ. The width of floor 536 can vary widely between about 0.01 mm and about 3 mm. By width of floor 536, Applicant's mean the distance between first wall 532 and second wall 534 as measured along floor 536.

The embodiment of carrier 500 shown in FIG. 6B includes a single permanent magnet 650 disposed in bezel portion 510. Magnet 650 has a "U-shape" formed by member 652 in combination with first arm 654 and second arm 656. In the embodiment shown in FIG. 6B, distal end 655 of first arm 654, and distal end 657 of second arm 656, both extend through surface 512 of bezel portion 510. In other embodiments, distal end 655 and/or distal end 657 does not extend through surface 512.

FIG. 6B shows distal end 642 of backplane 640 extending through aperture 630 (FIG. 6A). Backplane 640 comprises a portion of a data transfer device, such as data transfer station 130 (FIGS. 1, 2, 3, 4)/140 (FIGS. 1, 2, 3, 4). Suitable releaseable connectors are disposed on distal end 563 of data storage medium assembly 560, and on distal end 642 of backplane 640, to provide power to assembly 560 and allow transfer of information between data storage medium 562 and data transfer device 130/140.

Figure 6C:
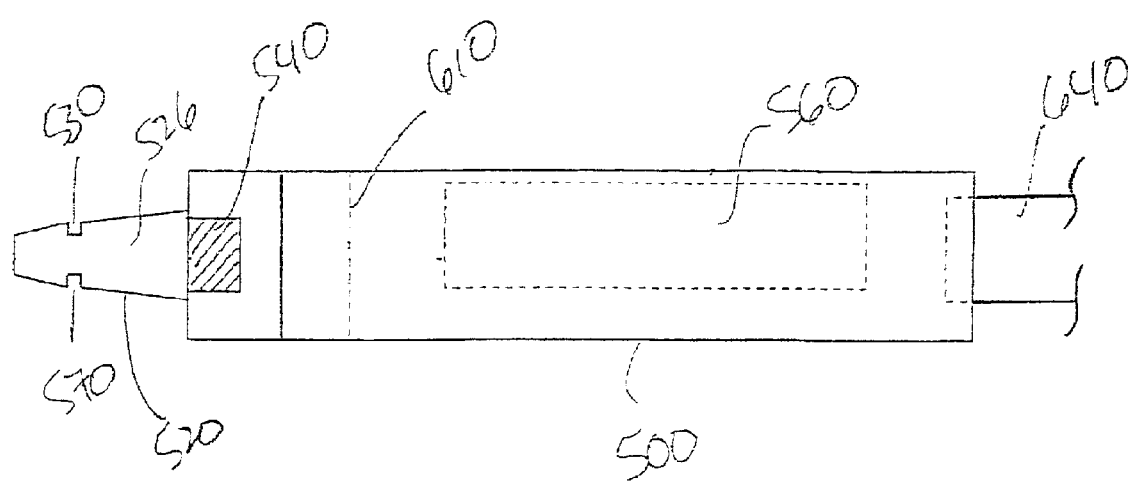
FIG. 6C is a side view of one embodiment of Applicants' carrier.

FIG. 6C is a side view of carrier 500. In the embodiment shown in FIG. 6C, guidepin 520 includes first groove 530 and second groove 570. In other embodiments, grooves 530 and 570 are connected at their respective ends to form a single, continuous groove, disposed around surface 526 of guidepin 520.

FIG. 7 shows gripper assembly 700. In the embodiment shown in FIG. 7, gripper assembly 700 includes enclosure 701. In certain embodiments, enclosure 701 includes six (6) sides wherein five of those six sides are enclosed. In these embodiments, enclosure 701 includes top portion 702, bottom portion 703, first side portion 704, second side portion 705, and rear portion 706. Side 707 opposes side 706. In certain embodiments, side 707 remains unenclosed. In other embodiments, side 707 is partially enclosed.

Gripper assembly 700 further includes fixturing assembly 710. Fixturing assembly 710 includes aperture 720, first solenoid 730 and second solenoid 740. First solenoid 730 receives power via conductors 731 (FIGS. 8A, 8B). Second solenoid 740 receives power via conductors 741. Gripper assembly 700 further includes electromagnet 750. In the embodiment shown in FIG. 7, electromagnet 750 has a "U shape." In this "U shape" embodiment, electromagnet 750 includes elongated body 752 having first end 754 and second end 756, first arm 760 having first end 762 and distal end 764, and second arm 780 having first end 782 and distal end 784. First end 762 of first arm 760 is disposed on second end 756 of elongated body 752 with distal end 764 extending outwardly from member 752. First end 782 of second arm 780 is disposed on first end 754 of elongated body 752 with distal end 784 extending outwardly from member 752.

First coil 770 is wound around first arm 760 of electromagnet 750. First coil 770 receives power via conductors 772. Second coil 790 is would around second arm 780 of electromagnet 750. Second coil receives power via conductors 792.

Referring now to FIGS. 8A and 8B, FIG. 8A is a front view of fixturing assembly 710, and FIG. 8B is a top view of assembly 710. First solenoid 730 includes proximal end 732 disposed within fixturing assembly 710. Member 830 is slidingly disposed through end 732 of solenoid 730 such that member 830 can move in the +X or in the −X direction. Distal end 834 of member 830 is disposed on a first side of retention spring attachment 820. Retention spring 830 is wound around proximal portion 832 of member 830, and is disposed between end 732 and retention spring attachment 820. First fixturing blade assembly 810 is disposed the second side of retention spring attachment 820.

When first solenoid 730 is not energized, i.e. when power is not provided to solenoid 730, retention spring 840 urges first fixturing blade assembly 810 to the most extended position in the −X direction. When solenoid 730 is energized, member 830 is retracted in the +X direction into solenoid 730 through end 732. Thus, energizing solenoid 730 causes fixturing blade assembly 810 to move in the +X direction.

Second solenoid 740 includes proximal end 742 disposed within fixturing assembly 710. Member 870 is slidingly disposed through end 742 of solenoid 740 such that member 870 can move in the +X or in the −X direction. Distal end 874 of member 870 is disposed on a first side of retention spring attachment 860. Retention spring 880 is wound around proximal portion 872 of member 870, and is disposed between end 742 and retention spring attachment 860. Second fixturing blade assembly 850 is disposed on the second side of retention spring attachment 860.

When second solenoid 740 is not energized, i.e. when power is not provided to solenoid 740, retention spring 880 urges second fixturing blade assembly 850 to the most extended position in the +X direction. When solenoid 740 is energized, member 870 is retracted in the −X direction into solenoid 740 through end 742. Thus, energizing solenoid 740 causes fixturing blade assembly 850 to move in the −X direction.

FIG. 9 shows fixturing device 900. In certain embodiments, fixturing device 900 comprises a portion of gripper mechanism 700 (FIG. 7). Fixturing device 900 includes enclosure 901 having surface 902. Aperture 910 extends through front surface 902. Circular plate 980 is rotatably disposed in aperture 910 such that outer circumference 982 of plate 980 is slidingly attached to circumference 912 of aperture 910.

Plate 980 further includes aperture 984 which defines inner circumference 986, such that inner circumference 986 is symmetrically disposed around axis of rotation 988 which passes through centerpoint 914. Circular plate 980 includes at least one slot, such as slot 1010 disposed therethrough. Slot 1010 includes first end 1012 disposed adjacent inner circumference 986 and second end 1014 disposed adjacent outer circumference 982. In certain embodiments, plate 980 includes second slot 1020 disposed similarly therethrough. In certain embodiments, plate 980 includes a plurality of slots, such as slots 1010, 1020, 1030, and 1040, disposed similarly therethrough. In the embodiment shown in FIG. 9, each of slots 1010, 1020, 1030, and 1040, spirals outwardly across plate 980 in the same direction.

Motor 990 is disposed on front surface 902. External shaft 992 of motor 990 extends outwardly from solenoid 990 toward aperture 910. Distal end 993 of shaft 992 slidingly meshes with circumference 982 of plate 980, using for example a pinion gear (not shown in FIG. 9) or a bevel gear (not shown in FIG. 9), such that rotation of shaft 992 in a first direction causes plate 980 to rotate around circumference 912 in a first direction. Rotation of shaft 992 in a second direction causes plate 980 is rotate around circumference 912 in a second, i.e. opposite, direction.

Motor 994 is disposed on front surface 902. External shaft 996 of motor 994 extends outwardly from motor 990 toward aperture 910. Distal end 997 of shaft 992 meshes with circumference 982 of plate 980 such that rotation of shaft 996 in a first direction causes plate 980 to rotate around circumference 912 in a first direction. Rotation of shaft 996 in a second direction causes plate 980 is rotate around circumference 912 in a second, i.e. opposite, direction.

In certain embodiments, Applicants' fixturing assembly 900 include only one motor, such as motor 990 or motor 994. Certain embodiments include both motor 990 and motor 994. In such dual motor embodiments, motors 990 and 994 operate such that the rotations of shafts 992 and 996 cooperate. By cooperate, Applicants mean that if rotation of shaft 992 causes plate 980 to rotate, for example, in a clockwise direction around the Z axis, then shaft 996 rotates so as to also cause plate 980 to rotate in the clockwise direction around the Z axis.

Channel 920 is disposed internally within enclosure 901 from center point 914 of aperture 910 outwardly in the +Y direction. Fixturing blade 970 is slidingly disposed within channel 920. Rod 974 is disposed on first side 972 of fixturing blade 970, and extends outwardly therefrom in the +Z direction. In the embodiment shown in FIG. 9, rod 974 is perpendicular to side 972. Beveled edge 976 is disposed on a second side of fixturing blade 970.

The distal end of rod 974 extends through slot 1010 disposed through plate 980. Rotation of plate 980 in a first direction causes fixturing blade 970 to move in a first direction in channel 920. Rotation of plate 980 is a second direction causes fixturing blade 970 to move in a second direction in channel 920.

In certain embodiments, Applicants' fixturing assembly includes more than one fixturing blade, wherein each such moveable fixturing blade is slidingly disposed in a separate channel. For example and referring to FIG. 10, a first embodiment of fixturing assembly 1000 includes first fixturing blade 970 slidingly disposed in channel 920 and second fixturing blade 1050 slidingly disposed in channel 940. In this embodiment, rod 974 extends through slot 1010 of circular plate 980, and the rod 1054 extends through slot 1020 of plate 980. In this embodiment, operation of motor 990 (FIG. 9)/motor 994 (FIG. 9) in a first manner to cause shafts 992 (FIG. 9) and 996 (FIG. 9) to rotate cooperatively, causes, for example, fixturing blade 970 to move in channel 920 in a first direction, i.e. in the −Y direction, and causes second fixturing blade 1050 to move in channel 940 in a second direction, i.e. in the +Y direction. Thus, rotation of shafts 992/996 in this first manner causes fixturing blades 970 and 1050 to move inwardly toward aperture 960. Rotation of shafts 992/996 in the opposite manner, i.e. in their respective reverse directions, causes fixturing blades 970 and 1050 to move outwardly from aperture 960.

Yet another embodiment of fixturing assembly 1000 includes first fixturing blade 970, second fixturing blade 1050, third fixturing blade 1060, and fourth fixturing blade 1070, slidingly disposed in channels 920, 940, 930, and 950, respectively. In this embodiment, operation of motor 990 (FIG. 9)/motor 994 (FIG. 9) to cause shafts 992 (FIG. 9)/996 (FIG. 9) to rotate cooperatively in a first manner causes fixturing blade 970 to move in channel 920 in a first direction, i.e. in the −Y direction, and causes fixturing blade 1050 to move in channel 940 in a second direction, i.e. in the +Y direction, and causes third fixturing blade 1060 to move in channel 930 in a third direction, i.e. in the −X direction, and causes fourth fixturing blade 1070 to move in a fourth direction, i.e. in the +X direction. Thus, rotation of shaft 992 in this first direction causes fixturing blades 970, 1050, 1060, and 1070 to move inwardly toward aperture 960. Rotation of shafts 992/996 in their respective opposite directions causes fixturing blades 970, 1050, 1060, and 1070, to move outwardly from aperture 960.

FIG. 11A shows embodiment 1100 of Applicants' fixturing assembly. This embodiment includes the elements described above in conjunction with fixturing assembly 1000. Circular plate 980 is shown rotatably disposed on surface 1101. Rod 974 (FIG. 10) disposed on fixturing blade 970 extends through slot 1010 such that beveled edge 976 extends maximally into aperture 960. Similarly, fixturing blades 1050, 1060, and 1070, are disposed in channels 940, 930, and 950, respectively, such that beveled edges 1056, 1066, and 1076, respectively, extend maximally into aperture 960.

Retention spring 1110 has first end 1112 and second end 1114. End 1112 is disposed on plate 980 and second end 1114 is disposed on surface 1101. Retention spring 1120 has first end 1122 and second end 1124. End 1122 is disposed on plate 980 and second end 1124 is disposed on surface 1101. In FIG. 11A, retention springs 1110 and 1120 are in a first orientation. In this first orientation, these retention springs each have a minimum distance between their respective first ends and second ends. In this first orientation, springs 1110 and 1120 exert a combined first torque on plate 980.

As those skilled in the art will appreciate, Hooke's law provides that the force applied to a movable object fixtured to one end of a spring increases as that spring is extended. If plate 980 is rotated to in either direction around the Z axis from the first orientation shown in FIG. 11A to a second orientation, then retention springs 1110 and 1120 will be stretched, i.e. the distance between their respective first ends and second ends will increase. In this second orientation retention springs 1110 and 1120 will exert a combined second torque on plate 980, where that second torque exceeds the first torque. In the event motors 990/994 are energized and cause plate 980 to rotate into a second orientation, and in the event power to motors 990/994 is then interrupted, either intentionally or unintentionally, retentions springs 1110 and 1120 will immediately cause plate 980 to return to the first orientation shown in FIG. 11A.

FIG. 11B shows fixturing device 1110 when motors 990/996 have caused plate 980 to rotate into a second orientation. In this second orientation, plate 980 is rotated such that rods 974, 1054, 1064, and 1074, are moved in their respective slots toward outer circumference 982. This movement of rods 974, 1054, 1064, and 1074, causes fixturing blades 970, 1050, 1060, and 1070, to move outwardly in their respective channels away from aperture 960. This movement of fixturing blades 970, 1050, 1060, and 1070, causes beveled edges 976, 1056, 1066, and 1076, to retract into assembly 1100 away from aperture 960.

Figure 14A:
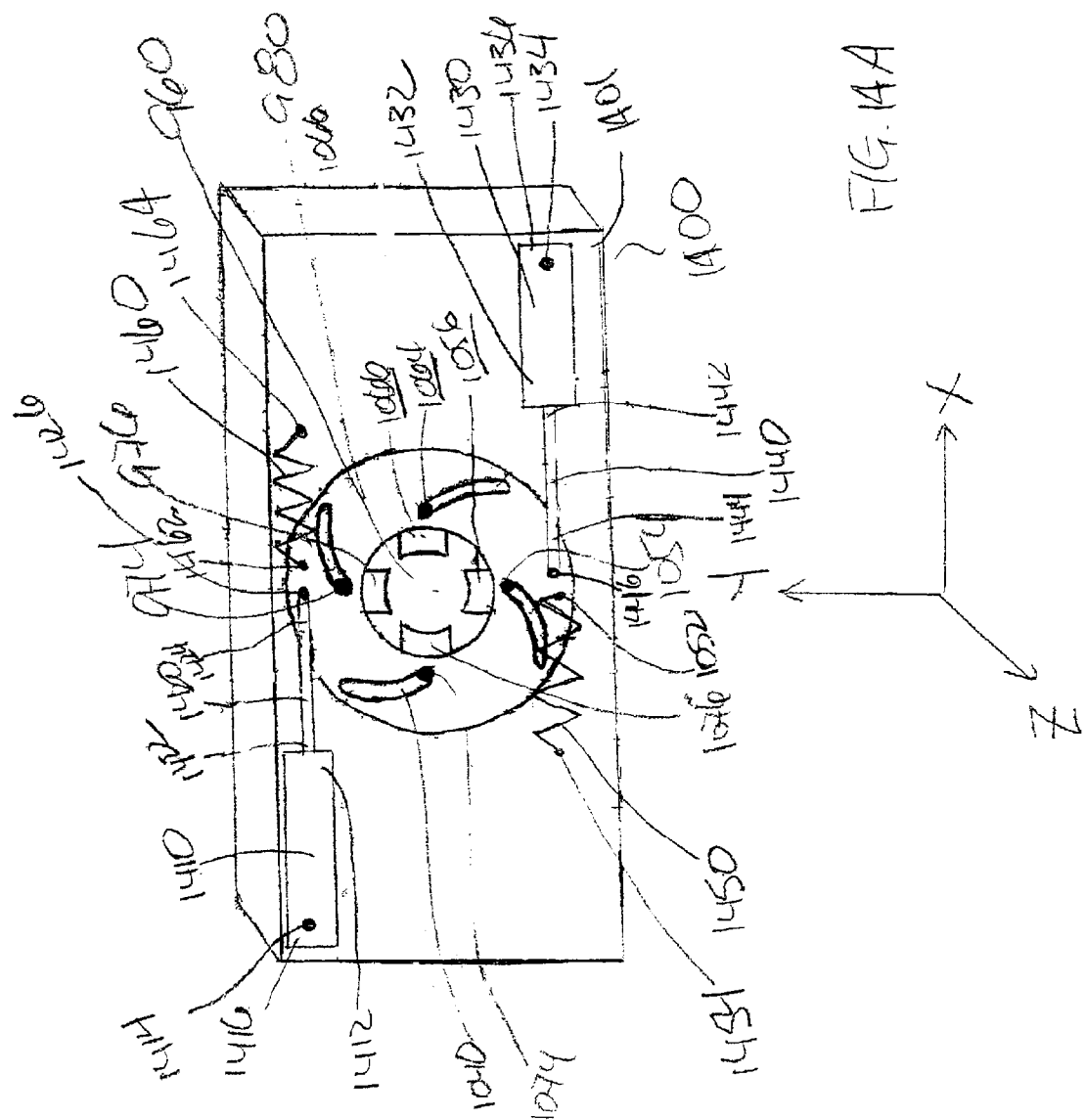
FIG. 14A is a perspective view of a first orientation of a fifth embodiment of Applicants' fixturing assembly.

FIG. 14A shows embodiment 1400 of Applicants' fixturing assembly. This embodiment includes the elements described above in conjunction with fixturing assembly 1100, except that motors 990/994 and shafts 992/996 are replaced by solenoids 1410 and 1430 in combination with slidingly moveable members 1420 and 1440, respectively. Retention spring 1450 has first end 1452 attached to plate 980 and second end 1454 attached to surface 1401. Retention spring 1460 has first end 1462 attached to plate 980 and second end 1464 attached to surface 1401.

Solenoid 1410 is pivotably attached to surface 1401 at pivot point 1414. Pivot point 1414 is disposed adjacent end 1416 of solenoid 1410. Proximal end 1422 of member 1420 slidingly extends through end 1412 of solenoid 1410. Distal end 1424 of member 1420 is pivotably attached to plate 980 at pivot point 1426.

Solenoid 1430 is pivotably attached to surface 1401 at pivot point 1434. Pivot point 1434 is disposed adjacent end 1436 of solenoid 1430. Proximal end 1442 of member 1440 slidingly extends through end 1432 of solenoid 1430. Distal end 1444 of member 1440 is pivotably attached to plate 980 at pivot point 1446.

In FIG. 14A, rotatable plate 980 and retention springs 1450 and 1460 are in a first orientation. In this first orientation, retention springs 1450 and 1460 each have a minimum distance between their respective first ends and second ends. In the event solenoids 1410 and 1430 are energized and cause plate 980 to rotate into a second orientation, and in the event power to solenoids 1410 and 1430 is then interrupted, either intentionally or unintentionally, retention springs 1450 and 1460 will immediately cause plate 980 to return to the first orientation shown in FIG. 14A.

FIG. 14B shows fixturing device 1400 when solenoids 1410 and 1430 have been energized causing members 1420 and 1440 to retract inwardly into ends 1412 and 1432, respectively, of solenoids 1410 and 1430, respectively. Movement of member 1420 in the −X direction, and movement of member 1440 in the +X direction, causes plate 980 to rotate to the second orientation shown in FIG. 14B. In this second orientation, plate 980 is rotated such that rods 974, 1054, 1064, and 1074, are moved in their respective slots toward outer circumference 982. This movement of rods 974, 1054, 1064, and 1074, causes fixturing blades 970 (FIGS. 9, 10), 1050 (FIGS. 9, 10), 1060 (FIGS. 9, 10), and 1070 (FIGS. 9, 10), to move outwardly in their respective channels away from aperture 960. This movement of fixturing blades 970, 1050, 1060, and 1070, causes beveled edges 976 (FIGS. 9, 10, 11A, 11B, 14A), 1056 (FIGS. 9, 10, 11A, 11B, 14A), 1066 (FIGS. 9, 10, 11A, 11B, 14A), and 1076 (FIGS. 9, 10, 11A, 11B, 14A), to retract into assembly 1400 outwardly from aperture 960.

Each accessor moveably disposed in Applicants' data storage and retrieval system includes at least one gripper assembly 700 (FIG. 7). In certain embodiments, Applicants' gripper assembly includes fixturing assembly 710. In certain embodiments, Applicants' gripper assembly includes fixturing assembly 900. In certain embodiments, Applicants' gripper assembly includes fixturing assembly 1000. In certain embodiments, Applicants' gripper assembly includes fixturing assembly 1100. In certain embodiments, Applicants' gripper assembly includes fixturing assembly 1400.

Figure 12:
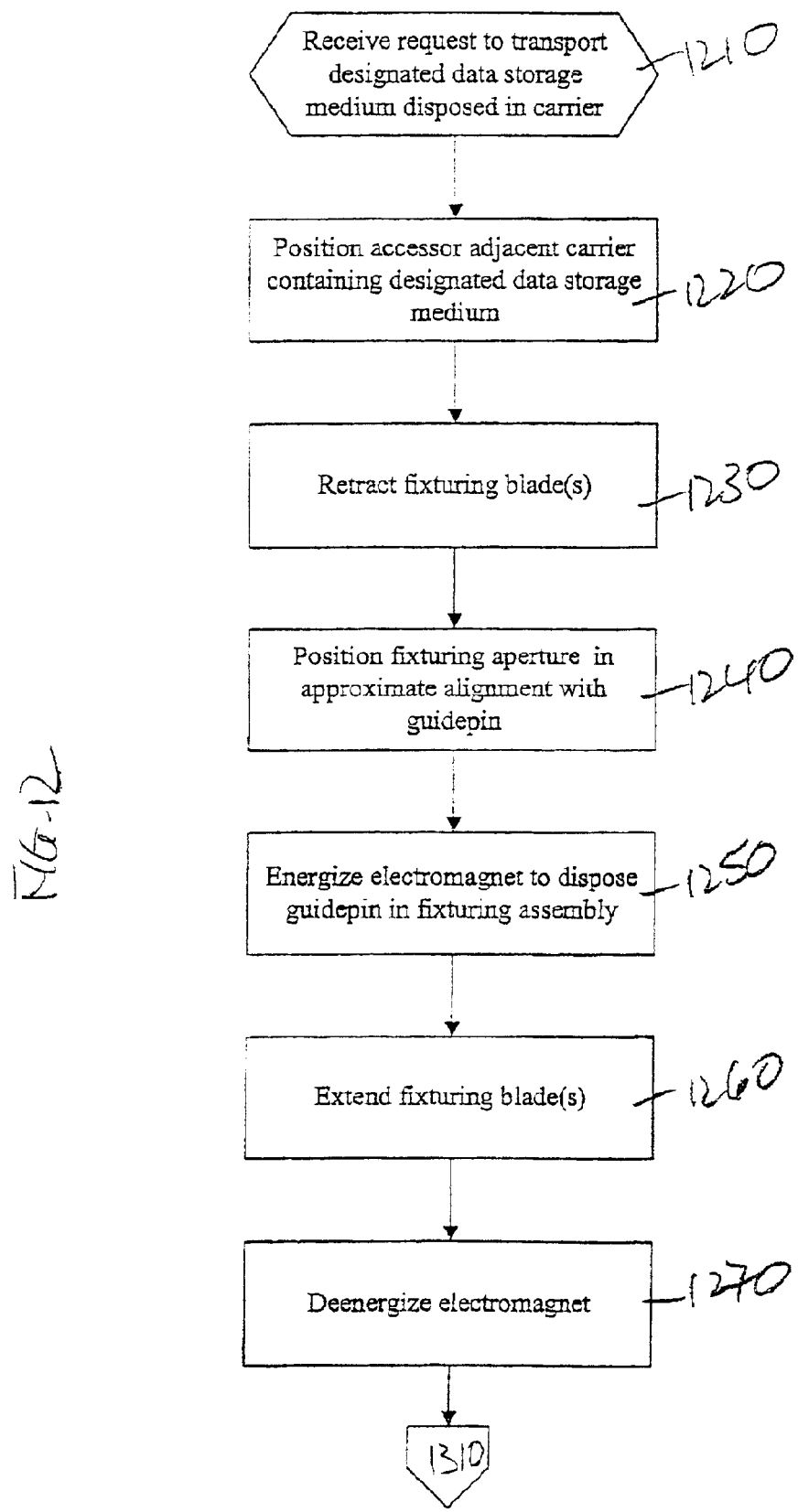
FIG. 12 is a flow chart summarizing the steps in Applicants' method to retrieve Applicants' carrier.

Applicants' invention includes a method to releaseably attach Applicants' carrier 500 (FIGS. 5, 6A, 6B, 6C) to Applicants' gripper mechanism 700 (FIG. 7). Referring now to FIG. 12, in step 1210 Applicants' data storage and retrieval system receives a request from a host computer to transport a designated data storage medium disposed in Applicants' carrier. In certain embodiments of Applicants' method, the host requests the carrier/designated data storage medium be transported from a storage slot to a data transfer device. In certain embodiments, the host requests the designated carrier/data storage medium be transported from a data storage device to a storage slot. In certain embodiments, the host requests the designated data storage medium/carrier be transported to import/export station 172 (FIG. 1).

In step 1220, gripper mechanism 700 (FIG. 7) is positioned adjacent the carrier housing the designated data storage medium. In step 1230, the fixturing blades disposed in the fixturing assembly are retracted. In certain embodiments, step 1230 includes energizing solenoids 730 (FIGS. 7, 8A, 8B) and 740 (FIGS. 7, 8A, 8B). In certain embodiments, step 1230 includes energizing motors 990 (FIGS. 9, 10, 11A, 11B) and 994 (FIGS. 9, 10, 11A, 11B). In certain embodiments, step 1230 includes energizing solenoids 1410 (FIGS. 14A, 14B) and 1430 (FIGS. 14A, 14B).

In step 1240, the accessor is moved such that the fixturing aperture 720 (FIG. 7)/960 (FIGS. 9, 10, 11A, 11B, 14A, 14B) disposed on gripping mechanism 700 (FIG. 7) is positioned in approximate alignment with guidepin 520

(FIGS. 5, 6A, 6B, 6C). In step 1250, electromagnet 750 (FIG. 7) is energized using first power having a first voltage to generate a first magnetic field having a first polarity such that carrier 500 (FIGS. 5, 6A, 6B, 6C) is pulled toward gripping mechanism 700 (FIG. 7) and such that guidepin 520 is inserted into fixturing aperture 720 (FIG. 7)/960 (FIGS. 9, 10, 11A, 11B, 14A, 14B). Because Applicants' method utilizes the attraction between the first magnetic field generated by electromagnet 750 and the magnetic field(s) generated by magnet 540 (FIGS. 5, 6A, 6C), or magnets 540/550 (FIG. 5), or magnet 650 (FIG. 6B), the degree of alignment required in step 1240 is less than that required using prior art methods which do not employ the use of attractive magnetic fields.

In step 1260, the fixturing blades disposed in gripper mechanism 700 are extended such that those fixturing blades/beveled edges are inserted into groove 530 (FIGS. 5, 6A, 6B, 6C)/groove 570 (FIGS. 5, 6C). Inserting fixturing blades 810 (FIGS. 8A, 8B)/850 (FIGS. 8A, 8B), or beveled edge 976 (FIGS. 9, 10, 11A) or beveled edges 976/1056 (FIGS. 10, 11A), or beveled edges 976/1056/1066 (FIGS. 10, 11A)/1076 (FIGS. 10, 11A), into grooves 530/570 releaseably attaches carrier 500 (FIGS. 5, 6A, 6B, 6C) to gripper mechanism 700 (FIG. 7).

In certain embodiments, step 1260 includes discontinuing power to solenoids 730 (FIGS. 7, 8A, 8B)/740 (FIGS. 7, 8A, 8B). As described above, discontinuing power to solenoid 730 causes retention spring 840 (FIGS. 8A, 8B) to extend fixturing blade 810 (FIGS. 8A, 8B). Similarly, discontinuing power to solenoid 740 (FIGS. 7, 8A, 8B) causes retention spring 870 (FIGS. 8A, 8B) to extend fixturing blade 850 (FIGS. 8A, 8B). In certain embodiments, step 1260 includes discontinuing power to motor 990 (FIGS. 9, 10, 11A, 11B) and to motor 994 (FIGS. 9, 10, 11A, 11B). As described above, discontinuing power to motors 990/994 causes retention springs 1110 (FIGS. 11A, 11B)/1120 (FIGS. 11A, 11B) to extend beveled edges 976/1056/1066/1076 (FIGS. 9, 10, 11A, 11B) into aperture 960 (FIGS. 9, 10, 11A, 11B, 14A, 14B). In certain embodiments, step 1260 includes discontinuing power to solenoids 1410 (FIGS. 14A, 14B) and 1430 (FIGS. 14A, 14B). As described above, discontinuing power to solenoids 1410 and 1430 causes retention springs 1450 (FIGS. 14A, 14B) and 1460 (FIGS. 14A, 14B) to extend beveled edges 976/1056/1066/1076 (FIGS. 14A, 14B) into aperture 960. In step 1270, first power to electromagnet 750 (FIG. 7) is discontinued.

Because power to solenoids 730 (FIGS. 7, 8A, 8B)/740 (FIGS. 7, 8A, 8B), or to motors 990 (FIGS. 9, 10, 11A, 11B)/994 (FIGS. 9, 10, 11A, 11B), or to solenoids 1410 (FIGS. 14A, 14B)/1430 (FIGS. 14A, 14B), is discontinued during transport of the designated data storage medium, the lifetimes of those solenoids/motors is increased, i.e. the mean time between failures for those devices increases. In addition, because those solenoids/motors are not continuously energized, the amount of heat generated during the transport of the designated data storage medium is reduced in comparison to use of prior art apparatus and methods. In addition, because those solenoids/motors are not continuously energized, the power requirements for Applicants' data storage and retrieval system are reduced in comparison with prior art apparatus and methods.

Applicants' invention includes a method to place, i.e. insert, a releaseably attached carrier 500 (FIGS. 5, 6A, 6B, 6C) into, for example, a data transfer device or into a storage slot. This method initially includes steps 1210, 1220, 1230, 1240, 1250, 1260, and 1270, after which Applicants' method transition to step 1310 wherein the accessor releaseably holding carrier 500 is moved to the designated destination.

In step 1320, the accessor/lifting servo section is properly positioned to insert the attached carrier into the designated destination. In certain embodiments, the accessor is positioned such that aperture 630 (FIG. 6A) in the rear of carrier 500 (FIGS. 5, 6A, 6B, 6C) is aligned with backplane assembly 640 (FIG. 6B) disposed in a data transfer station. In certain embodiments, the accessor is positioned in step 1320 such that the carrier can be inserted into a storage slot.

In step 1330, the fixturing blades disposed in gripper mechanism 700 (FIG. 7) are retracted. In certain embodiments, step 1330 includes energizing solenoids 730 (FIGS. 7, 8A, 8B) and 740 (FIGS. 7, 8A, 8B). In certain embodiments, step 1330 includes energizing motors 990 (FIGS. 9, 10, 11A, 11B)/994 (FIGS. 9, 10, 11A, 11B). In certain embodiments, step 1330 includes energizing solenoids 1410 (FIGS. 14A, 14B)/1430 (FIGS. 14A, 14B).

In step 1340, electromagnet 750 (FIG. 5) is energized using second power having a second voltage to generate a second magnetic field having a second polarity such that carrier 500 is pushed away from gripping mechanism 700. In step 1350, guidepin 520 (FIGS. 5, 6A, 6B, 6C) is expelled from fixturing aperture 720 (FIG. 7)/960 (FIGS. 9, 10, 11A, 11B, 14A, 14B). Because electromagnet 750 remains energized, and continues to produce the second magnetic field, repulsive magnetic forces expel guidepin 520 (FIGS. 5, 6A, 6B, 6C) from fixturing aperture 720 (FIG. 7) 960 (FIGS. 9, 10, 11A, 11B). In certain embodiments, gripper mechanism 700 (FIG. 7) is also caused to move away from the data transfer station/storage slot to assist in removing guidepin 520 from fixturing aperture 720/960. In step 1360, second power to electromagnet 750 is discontinued.

Applicants' invention includes a data storage and retrieval system comprising a computer useable medium having computer readable program code disposed therein for implementing Applicants' method to releaseably attach Applicants' carrier to Applicants' accessor. Applicants' invention further includes a data storage and retrieval system comprising a computer useable medium having computer readable program code disposed therein for implementing Applicants' method to retrieve, transport, and place Applicants' carrier at a designated destination, such as a data transfer station, or a storage slot, or an access door. The programming of the present invention may comprise a computer program product embodied as program code stored in a storage device, such as a magnetic disk drive or memory, etc., in a computer, or may comprise an article of manufacture, such as a CD ROM, magnetic tape, etc.

While the preferred embodiments of the present invention have been illustrated in detail, it should be apparent that modifications and adaptations to those embodiments may occur to one skilled in the art without departing from the scope of the present invention as set forth in the following claims.

We claim:

1. A portable carrier for a data storage medium, wherein said carrier is moveably disposed in a data storage and retrieval system, comprising:
    an enclosure having a first side;
    a first permanent magnet disposed in said first side;
    a guidepin disposed on said first side and extending outwardly therefrom;
    wherein said guidepin includes a first groove.

2. The carrier of claim 1, wherein said guidepin has a conical shape.

3. The carrier of claim 1, wherein said guidepin has a cylindrical shape.

4. The carrier of claim 1, further comprising a second permanent magnet disposed in said first side.

5. The carrier of claim 1, wherein said guidepin further includes a second groove.

6. The carrier of claim 1, further comprising a magnetic shield disposed within said enclosure adjacent said first magnet.

7. The carrier of claim 6, further comprising a second side having a facing relationship to said first side, wherein said second side includes an aperture.

8. The carrier of claim 7, further comprising a data storage medium, wherein said magnetic shield is disposed between said first permanent magnet and said data storage medium.

9. The carrier of claim 8, further comprising a data drive unit disposed with said enclosure, wherein said data storage medium is disposed in said data drive unit.

10. A portable carrier for a data storage medium, wherein said carrier is moveably disposed with a data storage and retrieval system, comprising:

an enclosure having a first side;

a permanent magnet disposed in said first side;

a guidepin disposed on said first side and extending outwardly therefrom, wherein said guidepin includes a groove;

a data drive unit disposed within said enclosure;

a data storage medium disposed within said data drive unit; and a magnetic shield disposed between said permanent magnet and said data storage medium.

* * * * *